US 8,467,109 B2

(12) United States Patent
Matsuoka

(10) Patent No.: US 8,467,109 B2
(45) Date of Patent: Jun. 18, 2013

(54) IMAGE PROCESSING APPARATUS AND METHOD

(75) Inventor: Taira Matsuoka, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 480 days.

(21) Appl. No.: 12/923,031

(22) Filed: Aug. 30, 2010

(65) Prior Publication Data

US 2011/0058232 A1    Mar. 10, 2011

(30) Foreign Application Priority Data

Sep. 8, 2009    (JP) .................................. 2009-207267

(51) Int. Cl.
H04N 1/04    (2006.01)

(52) U.S. Cl.
USPC ........... 358/474; 358/505; 358/516; 358/515; 358/1.9

(58) Field of Classification Search
USPC ............................ 358/505, 516, 515, 1.9, 474
See application file for complete search history.

(56) References Cited

U.S. PATENT DOCUMENTS

| 7,433,082 | B2 * | 10/2008 | Takenaka et al. | 358/2.1 |
| 7,508,552 | B2 * | 3/2009 | Touura | 358/474 |
| 8,089,656 | B2 * | 1/2012 | Oota | 358/1.9 |
| 2009/0141310 | A1 | 6/2009 | Matsuoka | |
| 2009/0237686 | A1 * | 9/2009 | Yoshida et al. | 358/1.9 |
| 2010/0165368 | A1 | 7/2010 | Matsuoka | |

FOREIGN PATENT DOCUMENTS

| JP | 2000-315258 | 11/2000 |
| JP | 3313592 | 5/2002 |
| JP | 2002-369012 | 12/2002 |
| JP | 3530324 | 3/2004 |
| JP | 3767210 | 2/2006 |
| JP | 3983101 | 7/2007 |
| JP | 2007-251835 | 9/2007 |
| JP | 2009-225274 | 10/2009 |
| JP | 4476203 | 3/2010 |

OTHER PUBLICATIONS

Abstract of JP 2003-046772 published on Feb. 14, 2003.
Abstract of JP 2007-088783 published on Apr. 5, 2007.

* cited by examiner

Primary Examiner — Houshang Safaipour
(74) Attorney, Agent, or Firm — Harness, Dickey & Pierce, P.L.C.

(57) ABSTRACT

An apparatus includes: a scanner to scan an image; a first determiner to determine an attribute of a feature of the image; a processor to perform a first processing on data representing the image; a storer to store the data subjected to the first processing; a receiver to instruct to output the image represented by the data stored and to receive an input for deciding an output image to be output of the image; a decider to decide, according to the input received, the output image; a second determiner to determine an attribute of a feature of the output image; a reliability determiner to determine, in accordance with the input, whether the attribute determined by the first and/or second determiner is reliable; and a processor to output, by performing a second processing on the data, output data representing the output image, in accordance with a result of the reliability determination.

20 Claims, 22 Drawing Sheets

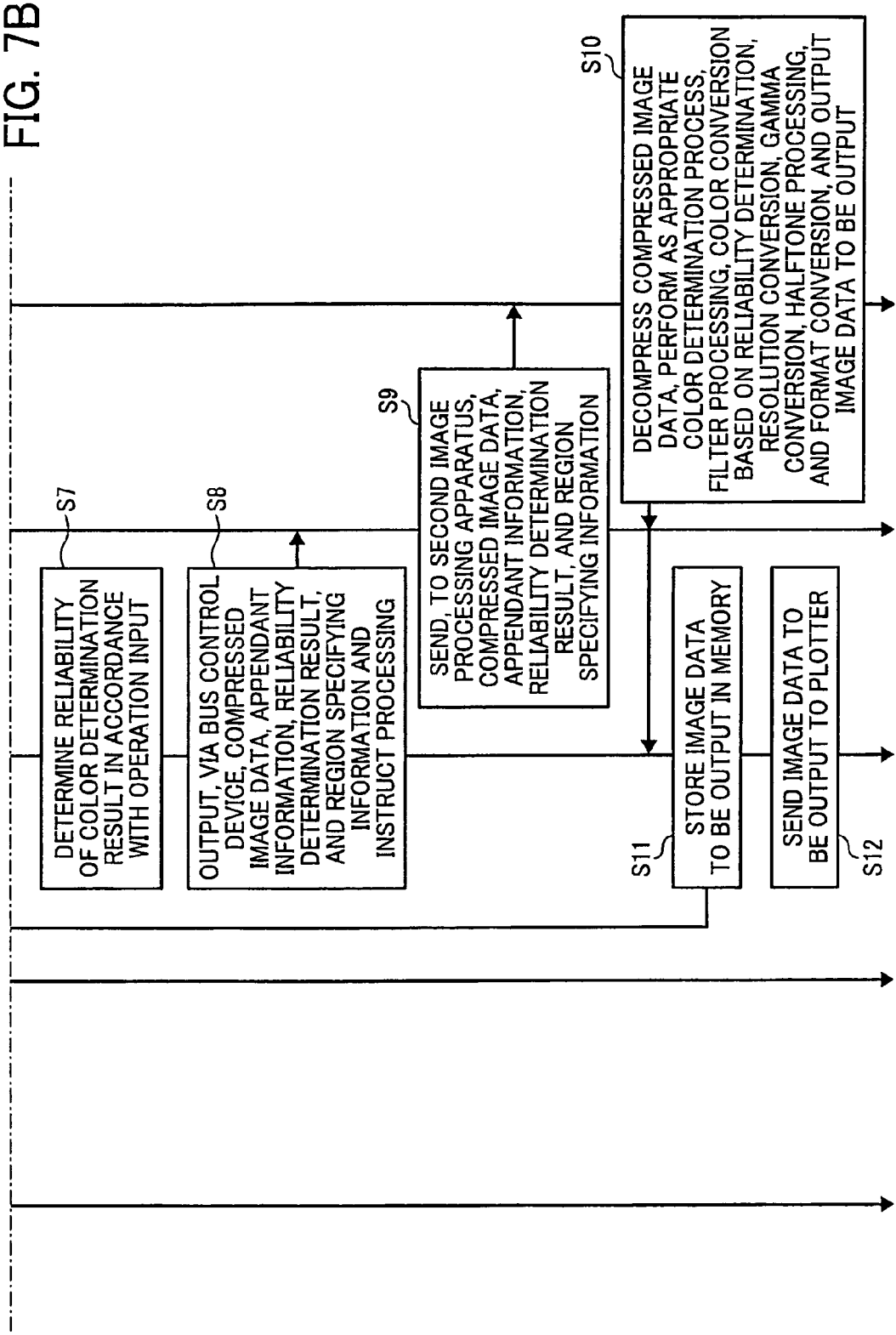

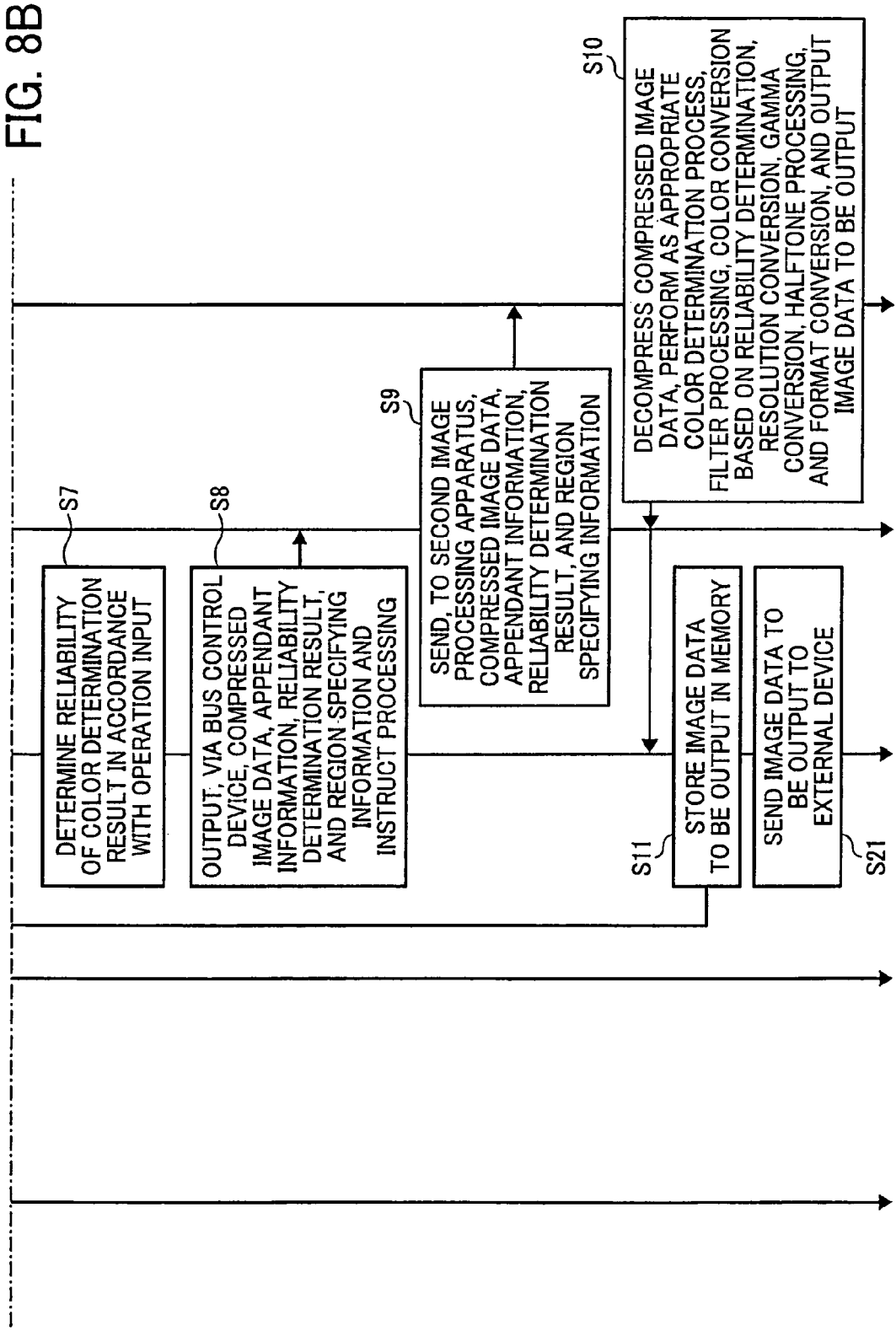

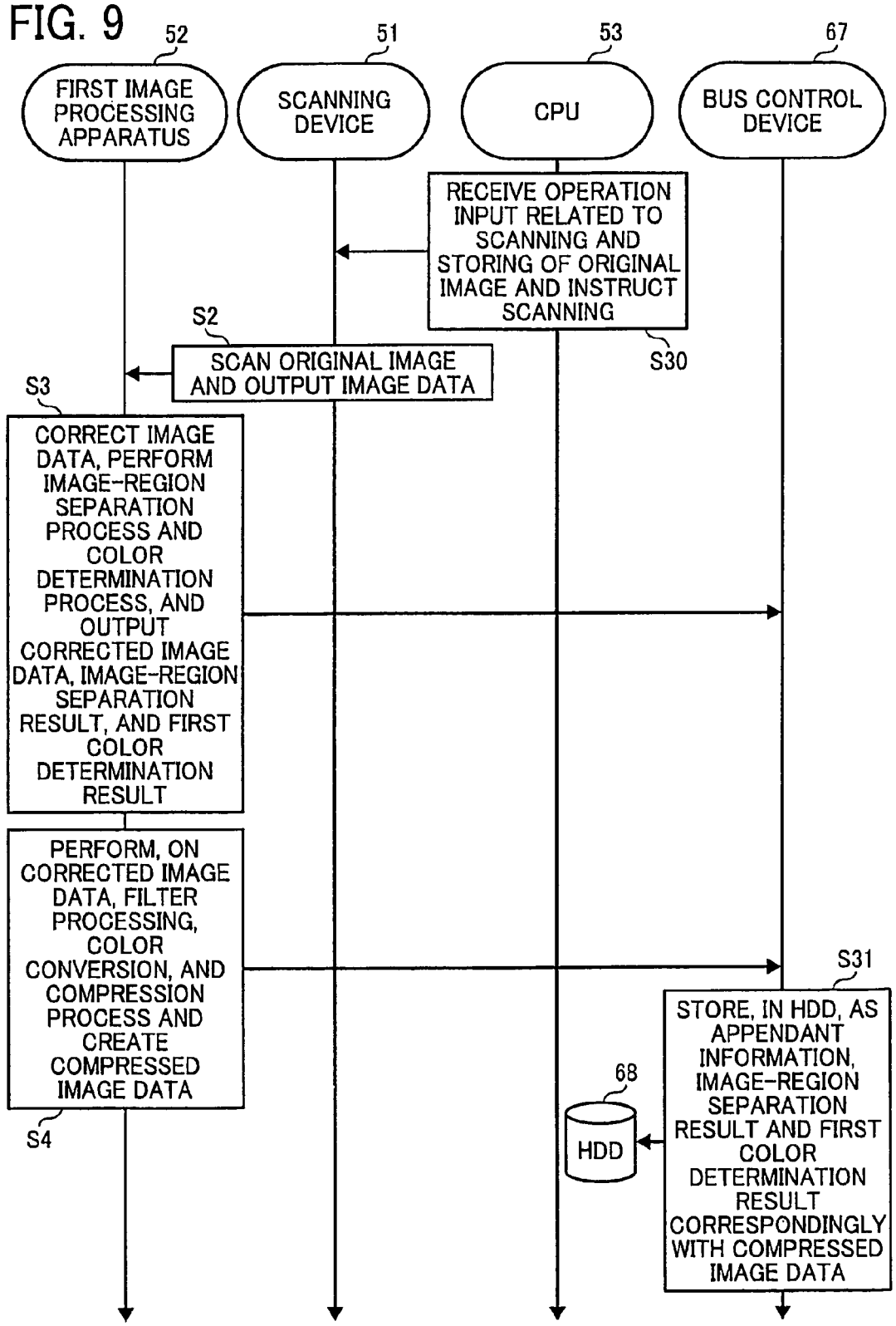

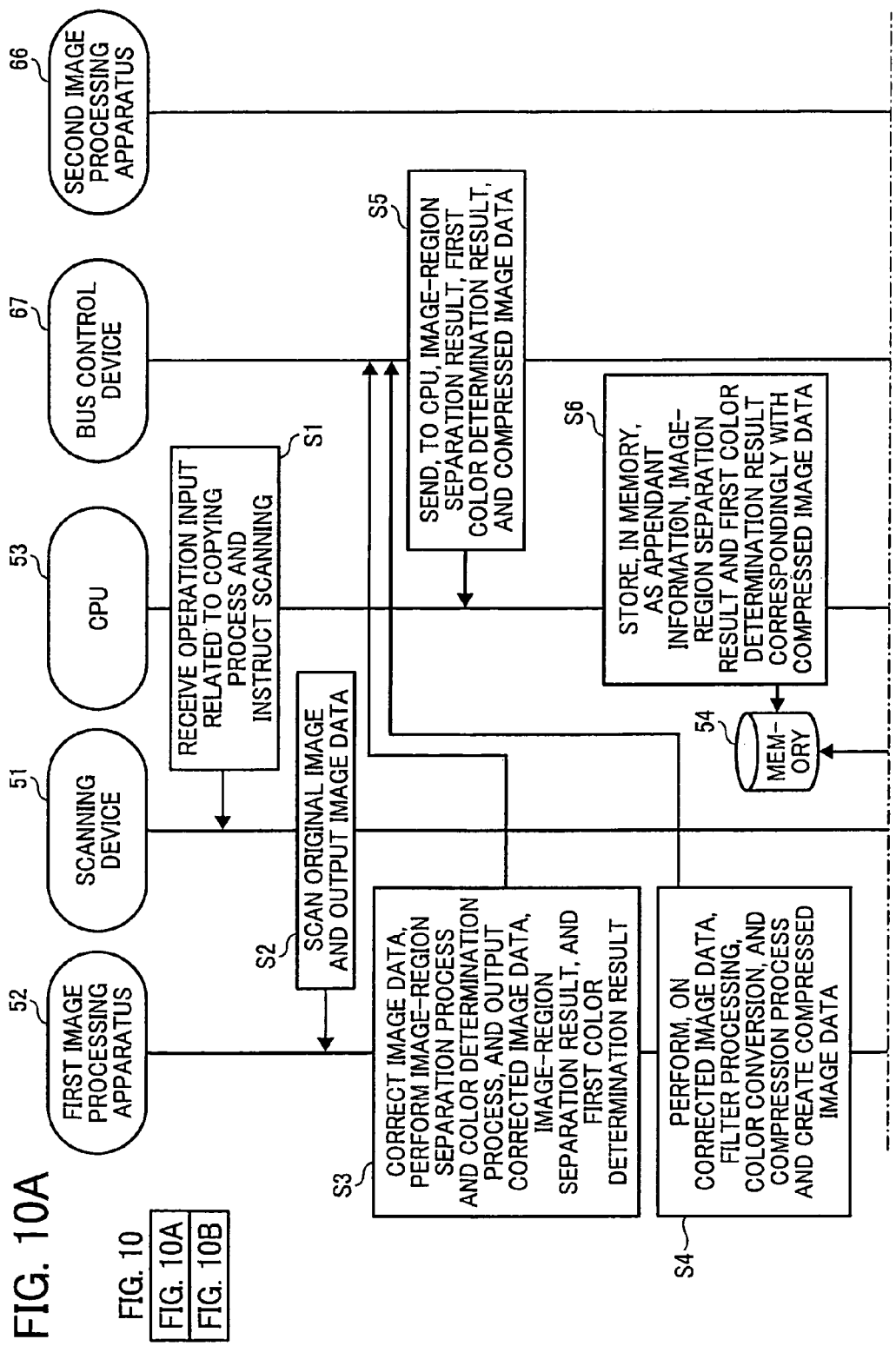

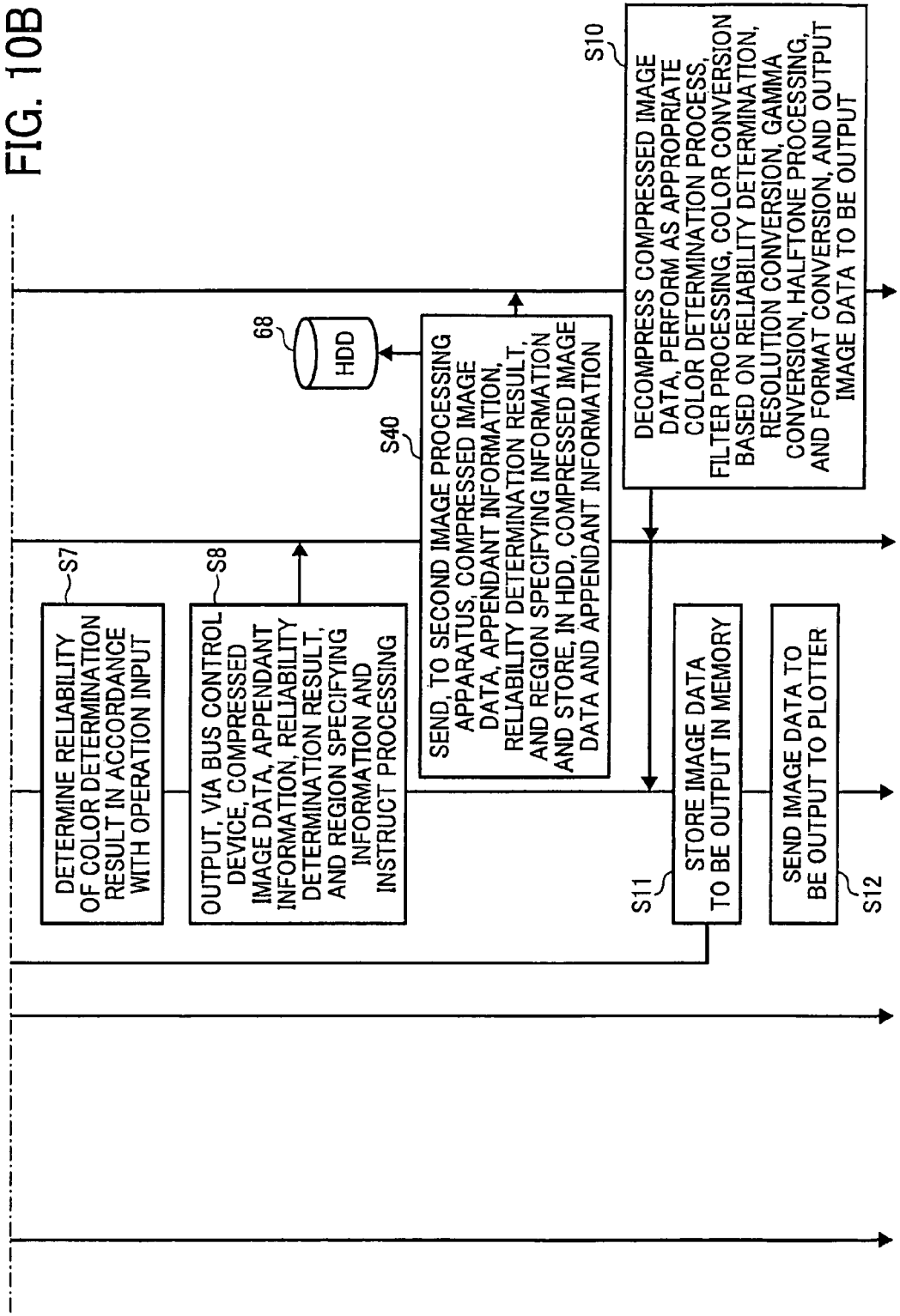

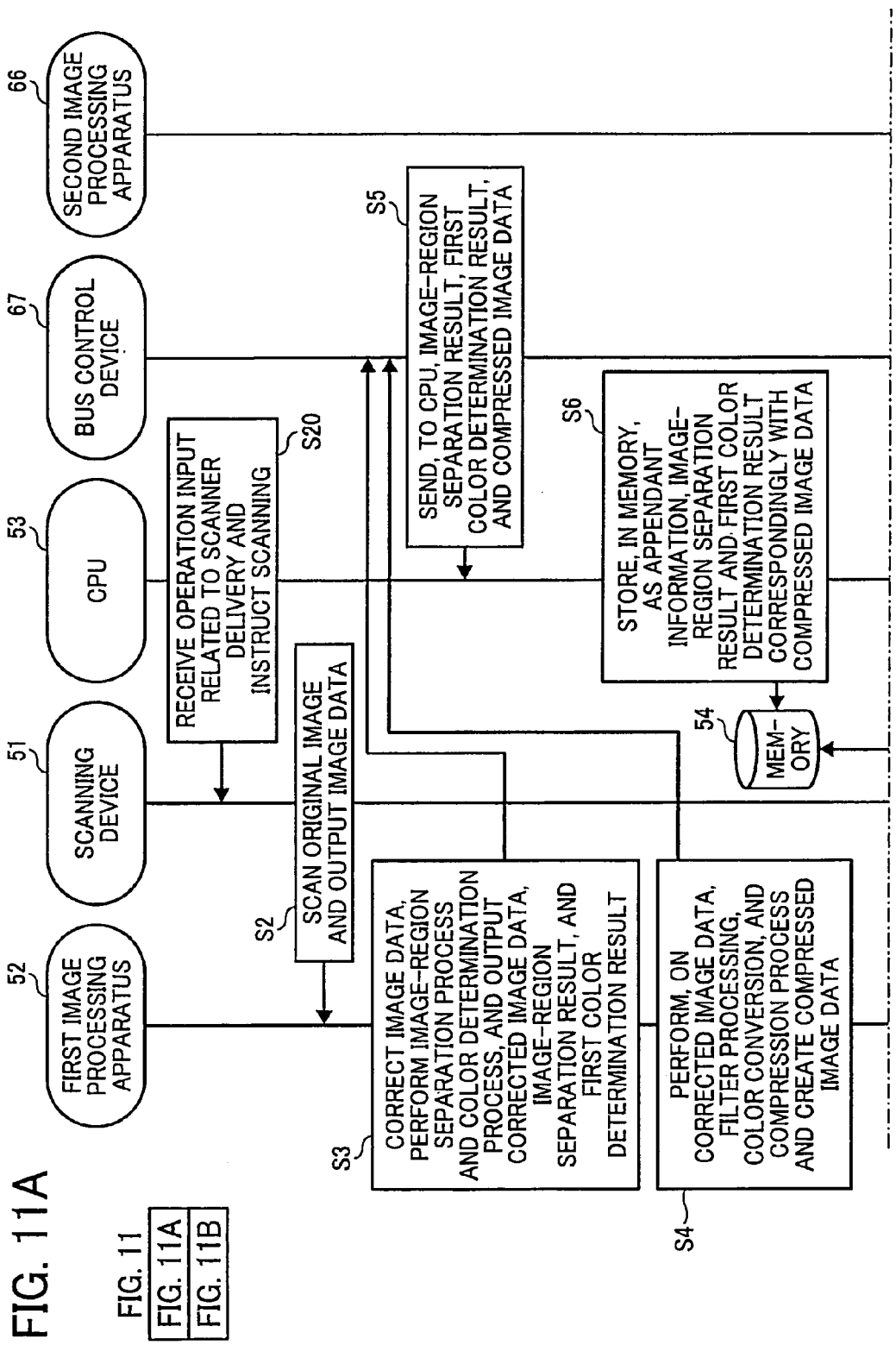

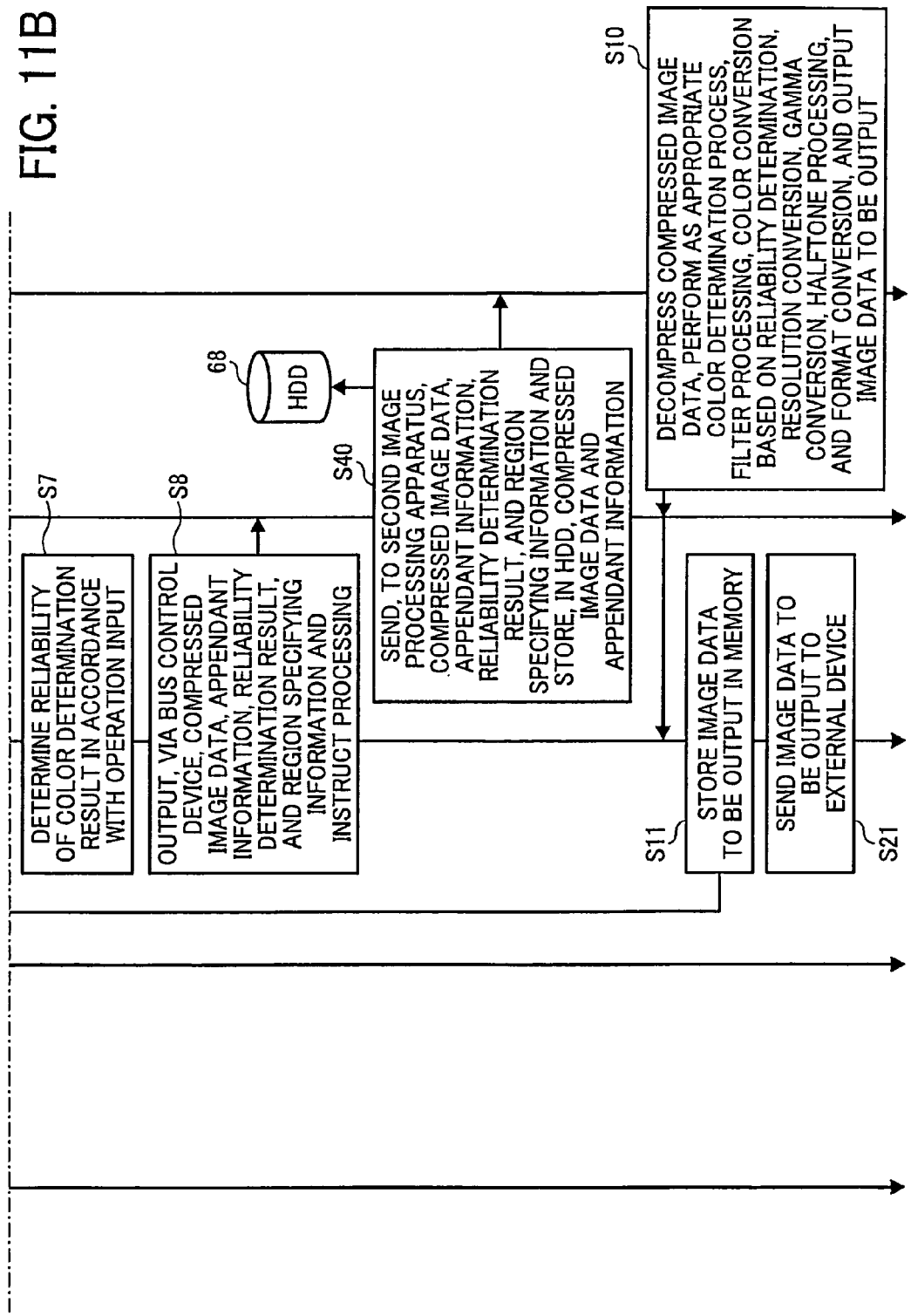

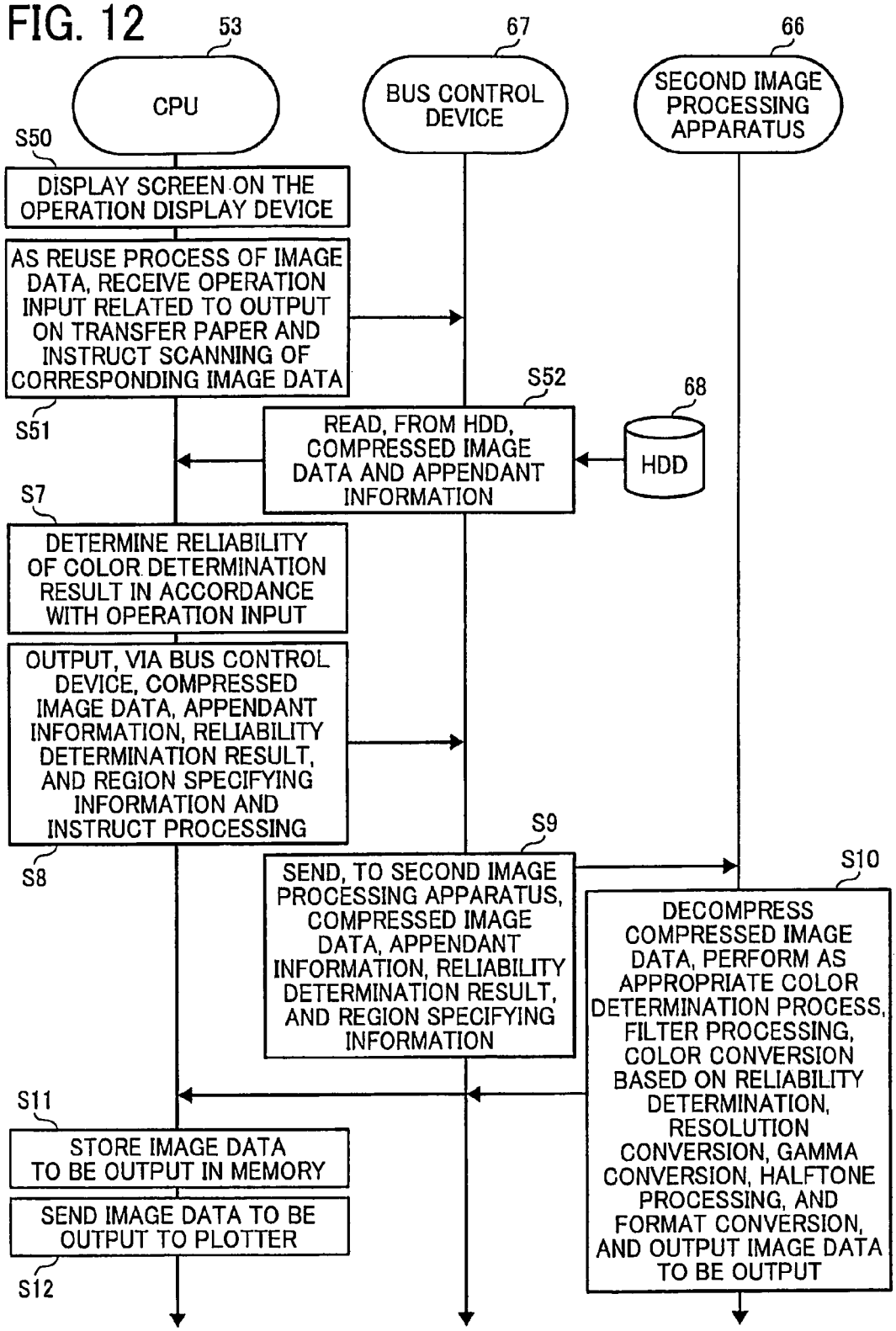

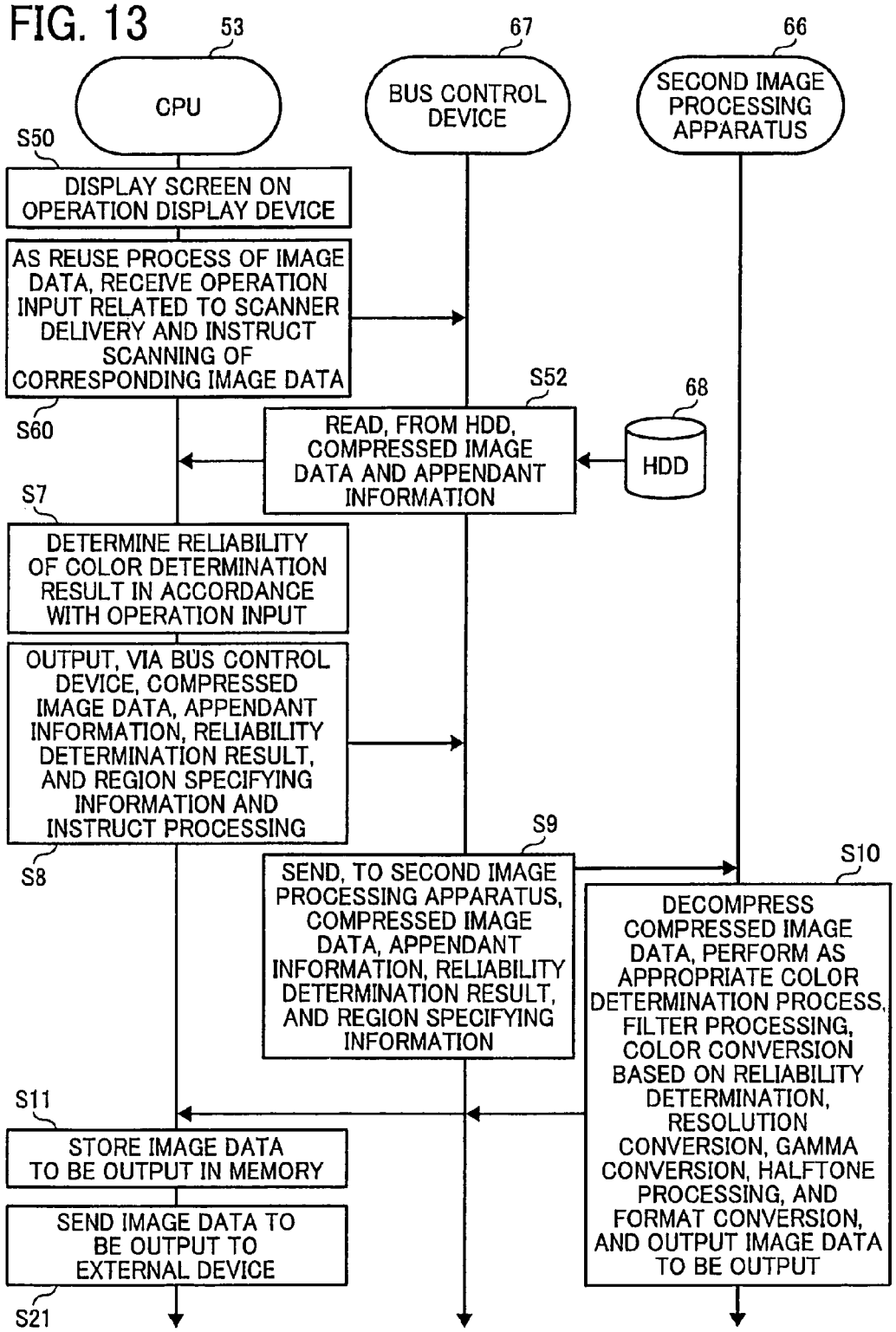

IMAGE PROCESSING APPARATUS AND METHOD

CROSS-REFERENCE TO RELATED APPLICATIONS

The present application claims priority to and incorporates by reference the entire contents of Japanese Patent Application No. 2009-207267 filed in Japan on Sep. 8, 2009.

BACKGROUND OF THE INVENTION

1. Field of the Invention

The present invention relates to an image processing apparatus and an image processing method.

2. Description of the Related Art

Conventionally, in an image forming process of a full color copy mode by digital color copying machines, a copying process related to four basic colors of cyan (C), magenta (M), yellow (Y), and black (Bk) is performed, and these colors are output on a sheet of transfer paper. Furthermore, when performing a copying process of a monochrome copy mode, a monochrome image is output on a sheet of transfer paper in a single copying process. Accordingly, in copying machines of this type, amounts of toners used in a full color mode and a monochrome mode largely differ from each other, and costs of copying for users of the copying machines largely change. Furthermore, depending on the modes, the images output on the sheets of transfer paper largely differ from one to the other, and thus the users need to be careful in switching operation modes between the color mode and the monochrome mode and must switch the operation mode in accordance with the type of image (original image) represented on an original as appropriate. To solve the burden of this type of operation mode switching, there is a technique for automatically determining whether an original image is a chromatic image or an achromatic image (color determination) and automatically switching, in accordance with the determination result, the operation mode of the copying machine (automatic color selection: ACS) is known. However, if the color determination is erroneous, in particular, if an achromatic image is erroneously determined as a chromatic image, the copying process is performed using the four CMYK colors. Accordingly, not only colors of an image output on the sheet of transfer paper become different from the color expected by the user but also the cost and the time required in the copying increase. Therefore, there is a need to perform the determination with high accuracy.

In recent years, digital color copying machines are not only used on their own, their compatibility with other devices that handle digital image data has been enhanced, and they are integrated with facsimile functions, printer functions, delivery scanner functions, or the like, and called multi function printers (MFP). Furthermore, because capacities of recording media, such as hard disc drives (HDDs) have increased and costs thereof have decreased, large-capacity storage media are starting to be used in MFPs. In the large-capacity storage media, it is possible to store original images scanned once or to store images received from other media. The stored images are readable again and reusable for purposes different from those at the time of the storage. For example, if an original image is scanned by a scanner and an image sent by delivery scanner functions is stored in an HDD, it is possible, without re-scanning the original image by a scanner, to deliver image data to an MFP different from the MFP that scanned the original image or to output the image data on a sheet of transfer paper anew. Furthermore, an original image may be output with equal-magnification upon scanning and thereafter, the same original image may be output enlarged at a magnification such as of 200%.

An image-region separation process of determining whether such an original image is a text region or a picture region and outputting a result of the determination as an image-region separation result, or a color determination process of determining whether the original image is a chromatic image or an achromatic image as described above may be performed. In such a process, processes are switched such that an appropriate process is performed depending on the result of the determination, and thus the process needs to be performed before filter processing, color-correction processing, and gamma processing. For example, Japanese Patent Application Laid-open No. 2007-251835 discloses a technique for simultaneously storing image data and appendant information (e.g., an image-region separation result) on the image data. Accordingly, while maintaining the quality of the image data stored in a storage device, it is possible to effectively utilize the capacity of the storage device. Furthermore, Japanese Patent Application Laid-open No. 2002-369012 discloses a technique for holding a plurality of pairs of image data and a color determination result.

However, to store data scanned by a scanner in a highly reusable manner as described in Patent Application Laid-open No. 2007-251835, the image data and the appendant information need to be stored such that a user is able to reuse them by an arbitrary method. As described above, a user of an MFP needs to be careful in the switchover between the color mode and the monochrome mode and to appropriately switch the modes in accordance with the type of the original. Accordingly, an ACS function of automatically switching an operation mode of a copying machine in accordance with a result of color determination is required when reusing. When an MFP is used as a copying machine, there is not only a problem that an image copied on a sheet of transfer paper largely differs from an image expected by a user, but also a problem that, if an achromatic image is erroneously determined as a chromatic image, the cost required for the copying increases and productivity decreases. However, when an MFP is used as a delivery scanner, although only information on brightness is fundamentally needed for an achromatic image, information on colors may be needed to increase the file size, which may suppress the capacity of an HDD drive included in a PC of a user because of determining the achromatic image as a chromatic image. Accordingly, there is a need to store a color determination result as appendant information of the stored image. According to Japanese Patent Application Laid-open No. 2007-251835, the color determination result is stored as appendant information of the stored image. As occasions of use for various purposes by users increase, the purposes of a user in the storing of an image and in the reusing of the image tend to differ from each other. Accordingly, a color determination result stored as appendant information may be different from the intention of the user.

By using the technique disclosed in Japanese Patent Application Laid-open No. 2002-369012, it is possible to store a pair of image data and a color determination result according to multiple modes of reuse. However, even when only a case is envisioned in which a magnification is changed for reusing, saving images corresponding to all magnifications that are specifiable with respect to one original requires a large-capacity HDD drive to be installed in the MFP. Accordingly, a conceivable approach is to recheck the determination when an image size desired by a user to be finally output by reusing a stored original image is determined, even if a color determination has been performed on the entire original image upon scanning of the original image. If the purposes by a user differ between the time of storing the original image and the time of reusing the original image, the color determination that has been performed upon the scanning of the original image may often be unreliable.

For example, if a magnification of an original image is changed by, for example, enlarging the original image and the enlarged image is output or if only a part of the original image is output, only the part of the original image that has been subjected to color determination upon scanning of the original image is output. At this time, because the entire original image is the area to be determined in the color determination upon the scanning of the original image, for an image to be output, which is a part of the entire original image, the color determination result is unreliable. Although the color determination of determining the attribute of whether the image is an achromatic image or a chromatic image, as a feature related to colors of the image, has been described as an example, the same description can be made for a case in which a determination of an attribute, as a feature related to an image quality of the image, which is a type of the original, such as of determining whether the original is a text original, a photographic original, a text and photographic original, or the like is performed. Specifically, even when an original as a whole is a text and photographic original, if only a part of an original image is output, only text may exist in that part. Accordingly, the determination of the original type upon the scanning of the original image may be unreliable.

SUMMARY OF THE INVENTION

It is an object of the present invention to at least partially solve the problems in the conventional technology.

According to an aspect of the present invention, an image processing apparatus includes: a scanning unit configured to scan an original image from an original; a first attribute determining unit configured to determine an attribute of an image feature of the original image scanned by the scanning unit; a first image processing unit configured to perform a first image processing on image data representing the original image; a storing unit configured to store the image data on which the first image processing has been performed by the first image processing unit; an input receiving unit configured to instruct to output the original image represented by the image data stored in the storing unit and to receive an operation input for deciding an output target image to be output of the original image; a deciding unit configured to decide, in accordance with the operation input received by the input receiving unit, the output target image to be output of the original image; a second attribute determining unit configured to determine an attribute of an image feature of the output target image decided by the deciding unit; a reliability determining unit configured to determine, in accordance with the operation input, at least one of whether the attribute determined by the first attribute determining unit is reliable and whether the attribute determined by the second attribute determining unit is reliable; and a second image processing unit configured to output, by performing a second image processing on the image data, output target image data representing the output target image, in accordance with a result of the determination by the reliability determining unit.

According to another aspect of the present invention, an image processing method includes: scanning by a processor an original image from an original; determining by the processor a first attribute of an image feature of the scanned original image; performing by the processor a first image processing on image data representing the original image; storing by the processor the image data on which the first image processing has been performed; instructing by the processor to output the original image represented by the stored image data and receiving by the processor an operation input for deciding an output target image to be output of the original image; deciding by the processor, in accordance with the received operation input, the output target image to be output of the original image; determining by the processor a second attribute of an image feature of the decided output target image; determining by the processor, in accordance with the operation input, at least one of whether the determined first attribute is reliable and whether the determined second attribute is reliable; and outputting by the processor, by performing a second image processing on the image data, output target image data representing the output target image, in accordance with a result of the determination of the reliability.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart illustrating the flow of a case in which the image forming apparatus 50 according to the first embodiment performs only an image storing process without performing the copying process and a scanner delivery process;

FIG. 10 is a flowchart illustrating the flow of a case in which the image forming apparatus 50 according to the first embodiment simultaneously performs a copying process and the image storing process;

FIG. 11 is a flowchart illustrating the flow of a case in which the image forming apparatus 50 according to the first embodiment simultaneously performs the scanner delivery process and the image storing process;

FIG. 12 is a flowchart illustrating the flow of a case in which the image forming apparatus 50 according to the first embodiment performs an output process, as a reuse process, for outputting an image on a sheet of transfer paper;

FIG. 13 is a flowchart illustrating the flow of a case in which the image forming apparatus 50 according to the first embodiment performs a scanner delivery process as the reuse process;

DETAILED DESCRIPTION OF THE PREFERRED EMBODIMENTS

In the following, a preferred embodiment of an image processing apparatus and method and an image processing program according to the present invention will be described with reference to the accompanying drawings.

First Embodiment

(1) Configuration

Figure 1:
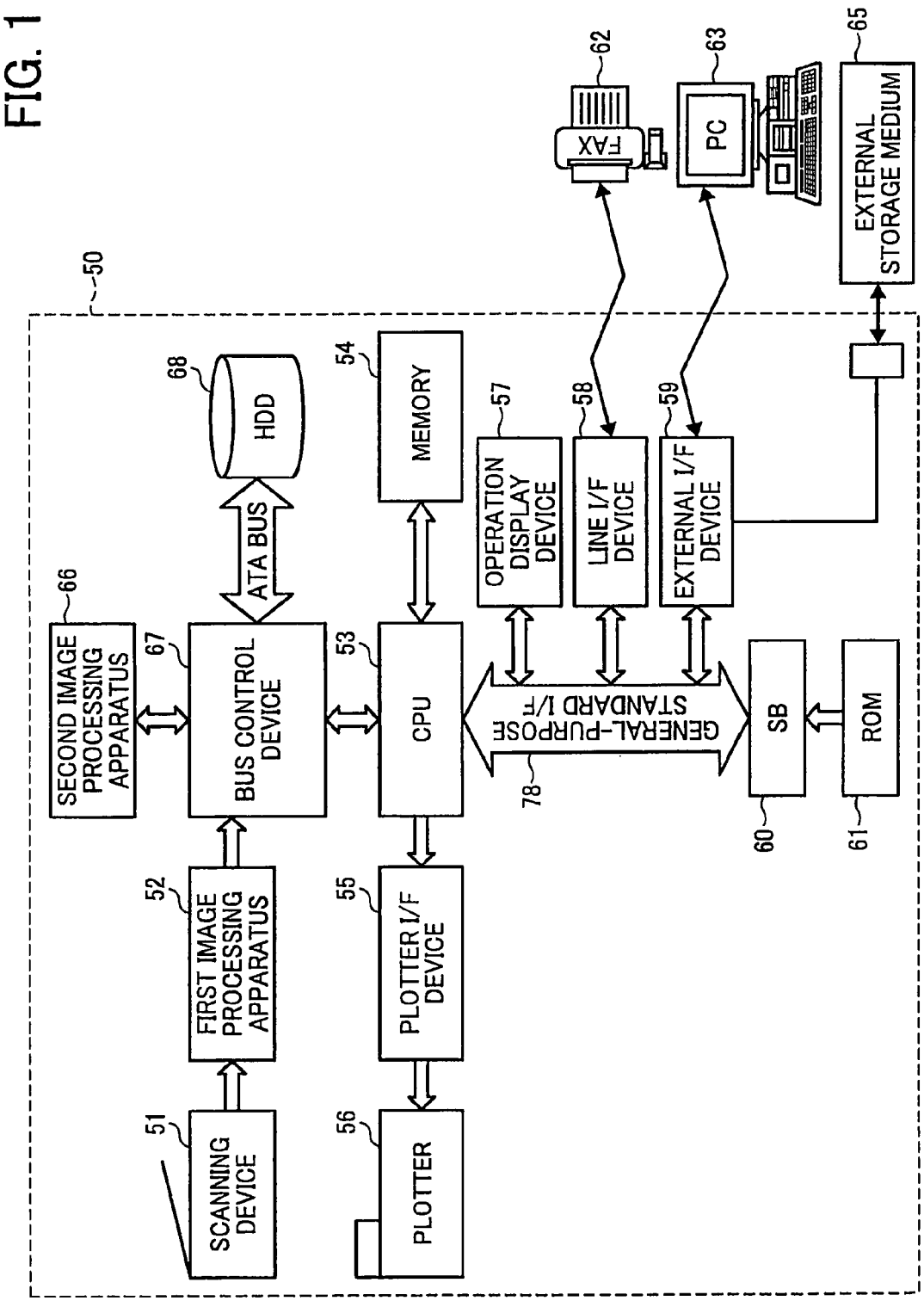
FIG. 1 is a schematic diagram illustrating an example configuration of an image forming apparatus according to a first embodiment.

FIG. 1 is a schematic diagram illustrating the configuration of an image forming apparatus according to a first embodiment. As illustrated in FIG. 1, the image forming apparatus 50 includes a scanning device 51, a first image processing apparatus 52, a second image processing apparatus 66, a bus control device 67, a hard disc drive (HDD) 68, a central processing unit (CPU) 53, a memory 54, a plotter interface (I/F) device 55, a plotter 56, an operation display device 57, a line I/F device 58, an external I/F device 59, a south bridge (SB) 60, and a read only memory (ROM) 61, thereby having the above described ACS function.

The scanning device 51 includes a line sensor including a charge coupled device (CCD) photoelectric conversion element, an analog to digital (A/D) converter, and a driving circuit that drives them (all not illustrated). The scanning device 51 scans an image (original image) represented on an original that is placed thereon; obtains shading information on the original image; represents, using the shading information, the original image; creates 8-bit RGB image data that is represented by each RGB color; and outputs the 8-bit RGB image data to the first image processing apparatus 52. In the first embodiment, the scan resolution of the scanning device 51 is 600 dpi; however, the resolution is not limited thereto.

The first image processing apparatus 52 performs, on the image data that is output from the scanning device 51, various kinds of image processing for, for example, unifying properties of the image data in such a manner that both the plotter 56 and a personal computer (PC) 63, which is an external device, can use the image data; and outputs the processed image data. Furthermore, for the original image represented by the image data that is output from the scanning device 51, the first image processing apparatus 52 determines the attribute of an image feature; outputs the determination result as appendant information; performs various kinds of image processing for unifying a predetermined characteristic of the image data; and outputs the processed image data. An image feature is, for example, as a feature of an image color, a chromatic image or an achromatic image, a white original or a color original, and, as a feature of an image quality, a text original, a photographic original, or a text and photographic original that is scanned by the scanning device 51. Whichever the image feature corresponds to is its attribute. In the first embodiment, the first image processing apparatus 52 determines whether the attribute, as the image feature, of an original image is a chromatic image or an achromatic image. Determining the attribute of a feature of image quality will be described in detail in another embodiment. The term "characteristic" means brightness, sharpness, color space, or the like. Furthermore, the first image processing apparatus 52 performs an image-region separation process, which will be described later, and outputs an image-region separation result. The configuration of the first image processing apparatus 52 will be described later in detail.

The bus control device 67 is a control device for a data bus that transmits and receives various kinds of data, such as image data and control commands that are necessary in the image forming apparatus 50, and has a bridge function between multiple standardized buses. In the first embodiment, the bus control device 67 is connected to the first image processing apparatus 52, the second image processing apparatus 66, and the CPU 53 via a general-purpose standard I/F 78, and it is also connected to the HDD 68 via an ATA bus, thereby implementing an ASIC. The general-purpose standard I/F 78 is, for example, a PCI-Express bus. The bus control device 67 associates image data with appendant information thereon, both of which are output from the first image processing apparatus 52, and stores them in the HDD 68. Details of the appendant information will be described later. The HDD 68 is a large storage device that is used to store various kinds of data or various kinds of programs. In the first embodiment, in particular, the HDD 68 stores therein the image data and the appendant information thereon in association with each other. For example, a hard disk connected to an ATA bus that is standardized by expanding an IDE can be used for the HDD 68.

The ROM 61 is a nonvolatile memory that stores therein various kinds of data or various kinds of programs that are used to perform a boot program, a copying process, a scanning process, or image processing. The memory 54 is a volatile memory that temporarily stores therein various kinds of programs or various kinds of data. For the memory 54, for example, a dual inline memory module (DIMM) or a hard disk drive (HDD) is used. The memory 54 stores therein various kinds of data that is temporarily exchanged in order to absorb a processing speed difference when the data is bridged between multiple standardized buses. The memory 54 also stores therein programs, which are executed by the CPU 53 when the CPU 53 controls the image forming apparatus 50, or stores therein various kinds of data that is used when the programs are executed. Image data is stored as the various kinds of data. Accordingly, the CPU 53 can freely read and write the image data stored in the memory 54. The CPU 53 is a microprocessor that performs the overall control of the image forming apparatus 50. For example, integrated CPUs, which are becoming widely used, may be used for the CPU 53. The integrated CPUs are microprocessors in which various functions are added to a single CPU core. Specifically, for example, RM 11100 manufactured by PMC-Sierra, Inc is used as the CPU 53, where a function to connect to various kinds of general-purpose standard I/Fs, such as a PCI-Express bus, or a function to connect between, using a crossbar switch, the various kinds of general-purpose standard I/Fs is integrated. The CPU 53 starts a system by executing a boot program that is stored in the ROM 61 during a normal startup. Subsequently, to perform a high-speed processing, the CPU 53 expands the program in the memory 54, which is accessible at high speed, and executes the program, thus performing various kinds of processing.

The second image processing apparatus 66 receives, via the CPU 53 and the bus control device 67, compressed image data and appendant information thereon; a color determination result (hereinafter, referred to as a "first color determination result") with respect to the original image; and region specifying information for specifying a region corresponding to an image to be output (output target image). When the second image processing apparatus 66 receives these, it performs, by using them, various kinds of image processing and outputs the processed image data. Details of the second image processing apparatus 66 will be described later.

The plotter 56 is a plotter that performs image forming by outputting, on a sheet of transfer paper, an image that is formed in accordance with the image data. For example, when the plotter 56 receives, via the plotter I/F device 55, CMYK image data, the plotter 56 outputs the image represented by the image data on the sheet of transfer paper using an electrophotography process with a laser beam. When the plotter I/F device 55 receives, from the CPU 53 via the general-purpose standard I/F 78 that is integrated with the CPU 53, the CMYK image data, the plotter I/F device 55 performs a bus bridge process for outputting the CMYK image data to the plotter 56.

The SB 60 is a general-purpose electronic device having a bridge function. In the first embodiment, the SB 60 functions as a bridge to the ROM 61. The operation display device 57 includes a display device, such as a liquid crystal display (LCD), that displays various kinds of information, a key switch, and the like. The operation display device 57 is integrated, as a single unit, with an operation panel that receives an operation input from a user. Examples of such operation inputs from a user include an instruction to scan or to output a copy of an image; specification of an output size upon output, of a range to be output of an original image, of a magnification, or of an image quality mode; specification of a resolution upon delivery scanning or of a range to be scanned; and setting of an ACS mode in which an image to be output is automatically determined to be a chromatic image or an achromatic image. By specifying the range to be output, an image to be output of the original image is specified. The term "image quality mode" indicates handling of the image quality of the image to be output. The image quality mode is, for example, a text mode in which an image to be output is treated as a text original, or a photographic mode in which an image to be output is treated as a photographic original. The operation display device 57 outputs, to the CPU 53 via the general-purpose standard I/F 78, control commands according to the operation inputs or displays information that is output, from the CPU 53, to be displayed.

The line I/F device 58 is a device that is used to connect the general-purpose standard I/F 78 to a telephone line. With the line I/F device 58, the image forming apparatus 50 performs, via the telephone line, for example, facsimile communication with a FAX 62 in order to transfer image data. The external I/F device 59 is a device that is used to connect the general-purpose standard I/F 78 to an external device. With the external I/F device 59, the image forming apparatus 50 is connected to the external device, thereby transferring various kinds of data. The external device is, for example, the PC 63 or an external storage medium 65, such as a compact flash (registered trademark) card or an SD card. The external I/F device 59 transfers various kinds of data to/from the PC 63 or an MFP (not illustrated) that is a digital multi function printer via a network (not illustrated) such as an Ethernet (registered trademark). The external I/F device 59 transfers various kinds of data to/from the external storage medium 65 via an external storage medium I/F (not illustrated). In particular, when a scan delivery process, which will be described later, is performed, an image data to be output (output target image data) that represents all or a part of the original image that is scanned by the scanning device 51 is sent to the external device such as the PC 63 via the external I/F device 59.

Figure 2:
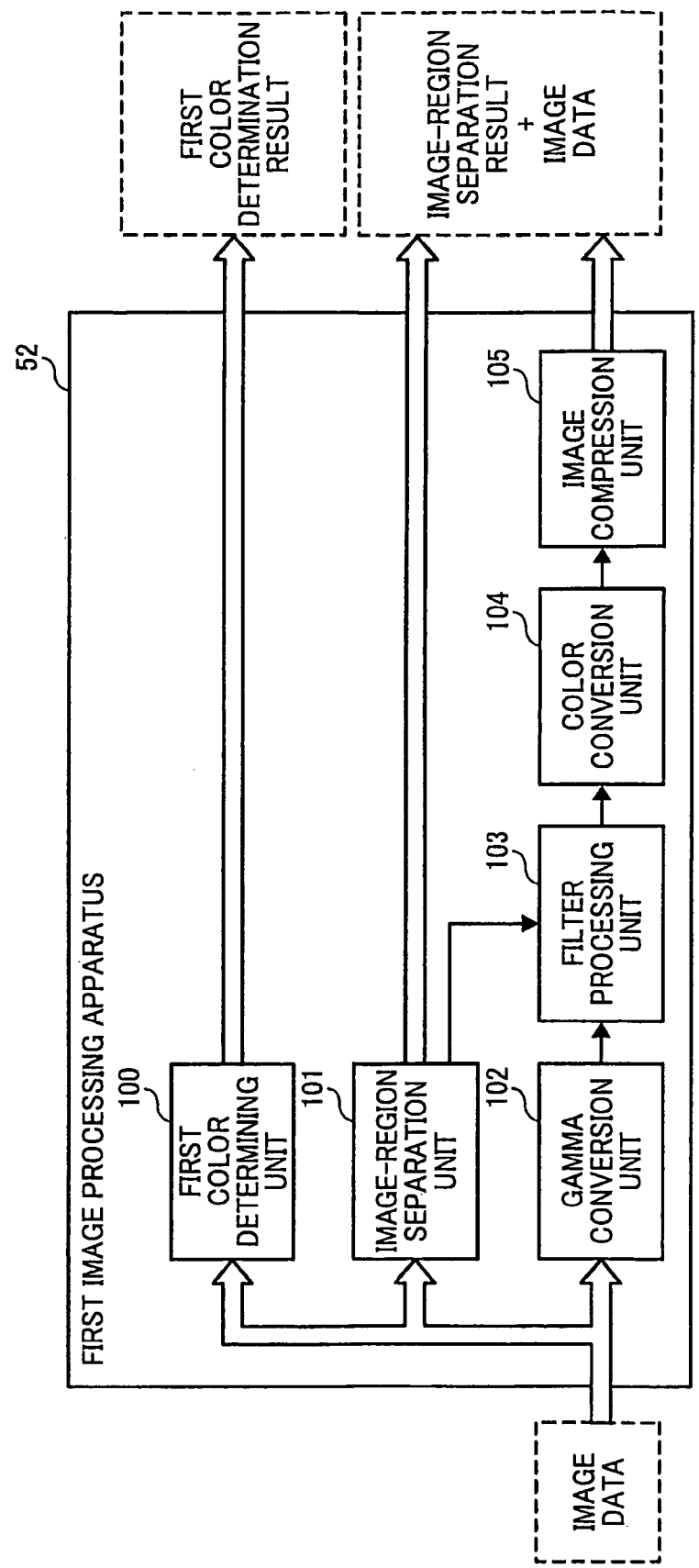
FIG. 2 is a schematic diagram illustrating an example configuration, in detail, of a first image processing apparatus 52 according to the first embodiment.

In the following, the configuration of the first image processing apparatus 52 will be described in detail with reference to FIG. 2. The first image processing apparatus 52 includes a first color determining unit 100, an image-region separation unit 101, a gamma conversion unit 102, a filter processing unit 103, a color conversion unit 104, and an image compression unit 105. The gamma conversion unit 102 receives image data that is output from the scanning device 51. The gamma conversion unit 102 corrects the brightness of the input image data. In the first embodiment, the gamma conversion unit 102 corrects the image data, which is output from the scanning device 51 with linear reflectance characteristics, such that the image data has a linear brightness characteristic. The gamma conversion unit 102 outputs the corrected RGB image data to the filter processing unit 103.

The image-region separation unit 101 receives RGB image data that is output from the scanning device 51. The image-region separation unit 101 performs an image-region separation process on the input image data. Specifically, the image-region separation unit 101 recognizes a line-drawing region of the original image that is represented by the input RGB image data; determines, using the ratio of the line-drawing region to a single-scanned original image, for each pixel, whether it belongs to a text region, a picture region, a chromatic region, or an achromatic region; and outputs the determination result as an image-region separation result.

Figure 3:
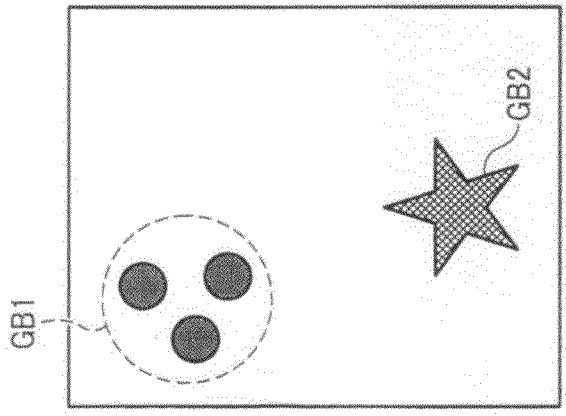
FIG. 3 is a schematic diagram illustrating an example of an original image.

Furthermore, the first color determining unit 100 also receives the image data that is output from the scanning device 51. The first color determining unit 100 performs a color determination process, in the ACS mode, on the input RGB image data. Specifically, the first color determining unit 100 recognizes a color of the original image that is represented by the input image data and performs a color determination process for determining whether the color, which is represented in an original image of a single scan, is monochrome or other than monochrome, i.e., for determining whether the image is a chromatic image or an achromatic image. Schematically, for example, if an RGB difference (difference between the maximum value and the minimum value of RGB) in each pixel that constitutes the input image data is equal to or greater than a predetermined difference, the first color determining unit 100 determines that a pixel is chromatic. If an RGB difference is less than the predetermined difference, the first color determining unit 100 determines that a pixel is achromatic. Then, if each chromatic pixel is continuously present for a predetermined length or more, the first color determining unit 100 determines that an image is a chromatic image. The predetermined difference is set, in advance, as a parameter (hereinafter, referred to as a "color determination parameter"). FIG. 3 is a schematic diagram illustrating an example of an original image. In FIG. 3, for example, an image portion GB1, which is a part of the original image, is an achromatic image that contains only a monochrome color, whereas an image portion GB2 is a chromatic image that contains a color other than black and white, thus indicating that an achromatic image and a chromatic image are both present in the original image. The original image in this case is determined to be a chromatic image. The first color determining unit 100 outputs, as the first color determination result, the result of the color determination process. Because a method of recognizing a line-drawing region and a method of a color determination process itself are described in, for example, Japanese Patent Application Laid-open No. 2003-46772, detailed description thereof will be omitted.

Figure 4:
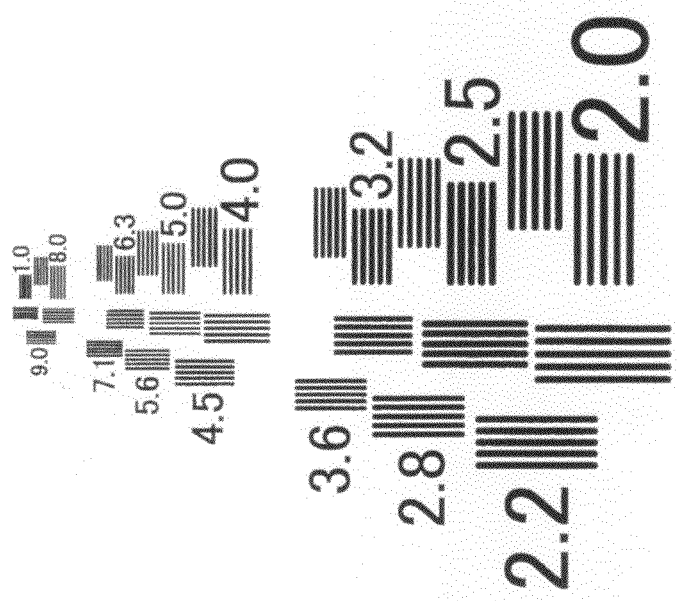
FIG. 4 is a schematic diagram illustrating a reference chart.

The filter processing unit 103 performs, on the RGB image data that is output from the gamma conversion unit 102, filter processing and outputs the RGB image data by making the sharpness thereof unified to the predetermined characteristic. In the first embodiment, for example, when the reference chart illustrated in FIG. 4 is scanned, the filter processing unit 103 corrects, for each line group, an MTF characteristic value so that it becomes a predetermined MTF characteristic value that is set in advance. Furthermore, when the MTF characteristic value is corrected, because a required characteristic value varies depending on a text region and a picture region, the filter processing unit 103 performs correction with respect to both the text region and the picture region. Accordingly, in the embodiment, an optimum filter processing is performed in accordance with the image-region separation result obtained from the image-region separation unit 101.

The color conversion unit 104 performs color conversion, to a predetermined RGB space, on the image data that is output from the filter processing unit 103 in such a manner that the image data can be used by both the plotter 56 and the PC 63, which is an external device, and in such a manner that the image data has a uniform property. The predetermined RGB space is, for example, a CIE-RGB space. Then, the color conversion unit 104 outputs image data subjected to the color conversion. The image compression unit 105 performs a compression process on RGB image data that has been subjected to the color conversion and that is output from the color conversion unit 104 and creates compressed image data. Alternatively, for example, the image compression unit 105 may perform the compression process on the image data by obtaining remaining storage capacity information that indicates the remaining level of the storage capacity of the memory 54 or the HDD 68 and by changing compressibility thereof in accordance with the remaining storage capacity information.

In the following, a typical function that is implemented in the first embodiment by the CPU 53 executing various kinds of programs stored in the ROM 61, the memory 54, or the HDD 68 will be described. After the CPU 53 receives, via the bus control device 67, the image-region separation result and the first color determination result, as the appendant information on the compressed image data, and also receives the compressed image data, all of which are output from the first image processing apparatus 52, the CPU 53 stores them in the memory 54. In accordance with an operation input that instructs the outputting of the original image that is input via the operation display device 57, the CPU 53 determines, from the original image, an image (hereinafter, referred to as an "image to be output") that corresponds to a region to be output. Furthermore, the CPU 53 determines, in accordance with the operation input, whether a size difference between the original image and an image to be output in the original image is equal to or greater than a predetermined size. If the determination result is positive, the CPU 53 determines that the first color determination result is unreliable. This determination is referred to as a "reliability determination". Specifically, the CPU 53 determines whether a magnification is specified as a magnification equal to or greater than a predetermined first magnification. If the determination result is positive, the CPU 53 determines that the first color determination result is unreliable. The value of the predetermined first magnification (e.g., 200%) is stored in, for example, the ROM 61 or the HDD 68 in advance. Furthermore, the CPU 53 determines whether a size difference between a part of the original image to be output and the original image containing an image to be output is equal to or greater than a predetermined size. If the determination result is positive, the CPU 53 determines that the first color determination result is unreliable. Furthermore, determining whether the image to be output is a part of the original image is performed by determining, for example, whether the output size, which is specified by the operation input, is smaller than the size of the original image, or it is performed by determining whether an image to be output, which is specified by the operation input, is a part of the original image. Furthermore, a case in which a size difference between the original image and an image to be output is equal to or greater than the predetermined size is a case, for example, in which the ratio of the size of the original image to the output size that is specified by the operation input or a size difference between an output image and the original image is equal to or greater than a predetermined magnitude or a case in which the ratio of an area of the original image to an image (image to be output) that is specified to be output by the operation input or an area difference between an image to be output and the original image is equal to or greater than a predetermined magnitude.

Figure 5:
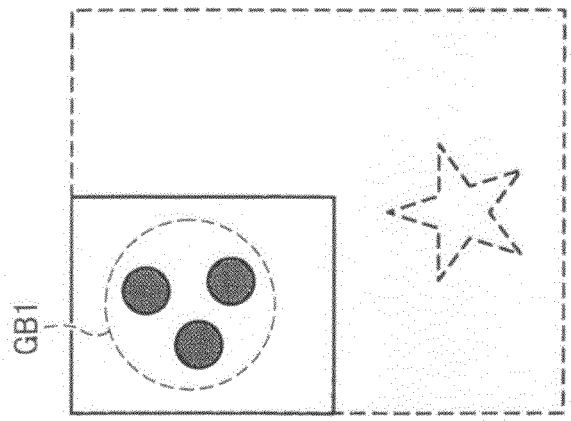
FIG. 5 is a schematic diagram illustrating an example image that is output by processing the original image illustrated in FIG. 3 using a magnification of 200%.

For example, if the original image illustrated in FIG. 3 is specified, by a user via the operation display device 57, to be output with a magnification of 200%, as illustrated in FIG. 5, the region of FIG. 5 in the upper left quarter is determined to be an image to be output. In this case, because the magnification is equal to or greater than the predetermined first magnification, the first color determination result is determined to be unreliable.

Then, to allow the second image processing apparatus 66 to perform processing, the CPU 53 reads, from the memory 54, the compressed image data and the appendant information thereon and outputs them to the second image processing apparatus 66 via the bus control device 67. Furthermore, the CPU 53 outputs, to the second image processing apparatus 66 via the bus control device 67, the reliability determination result and region specifying information that specifies a region to be output.

Figure 6:
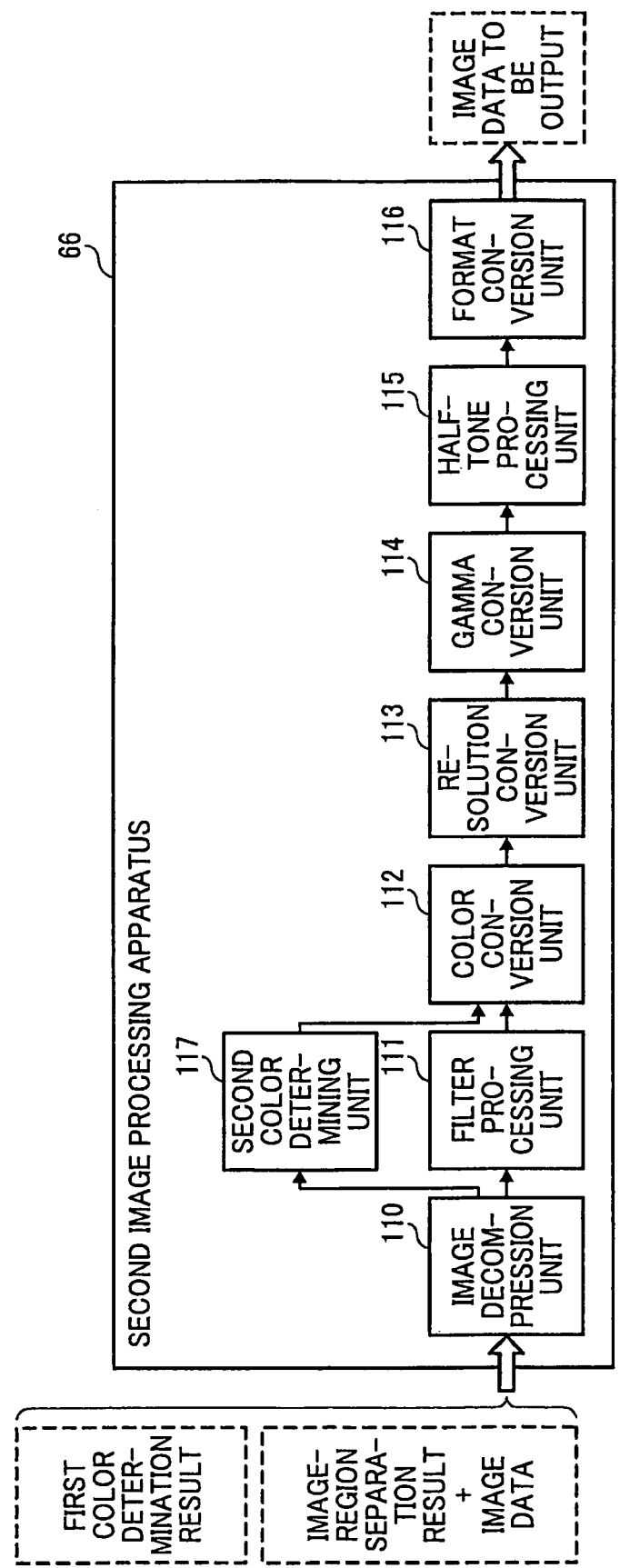
FIG. 6 is a schematic diagram illustrating an example configuration of a second image processing apparatus 66 according to the first embodiment.

In the following, the configuration of the second image processing apparatus 66 will be described with reference to FIG. 6. The second image processing apparatus 66 includes an image decompression unit 110, a filter processing unit 111, a color conversion unit 112, a resolution conversion unit 113, a gamma conversion unit 114, a halftone processing unit 115, a format conversion unit 116, and a second color determining unit 117. The second image processing apparatus 66 receives, via the CPU 53 and the bus control device 67, the compressed image data compressed by the first image processing apparatus 52 and the appendant information thereon, both of which are stored in the HDD 68; receives the reliability determination result; and receives the region specifying information. The image decompression unit 110 receives the compressed image data. Then, the image decompression unit 110 decompresses the compressed image data and outputs it.

For the image represented by RGB image data that is output from the image decompression unit 110, the second color determining unit 117 performs a color determination process for determining whether the image to be output, which corresponds to a region specified by the region specifying information, is a chromatic image or an achromatic image. The method for performing the color determination process may be the same as that performed by the first color determining unit 100 or different from that performed by the first color determining unit 100. For example, in the example illustrated in FIG. 5, because the image portion GB1, which has been explained using FIG. 3, is an achromatic image, the second color determining unit 117 determines that the image to be output is an achromatic image. In this way, if the original image contains both achromatic and chromatic colors, and, if there is a size difference between the original image and the image to be output, the first color determination result may possibly be different from the result of the color determination process that is performed by the second color determining unit 117. Then, the second color determining unit 117 outputs the result of the color determination process as a second color determination result.

For RGB image data that is output from the image decompression unit 110, the filter processing unit 111 performs filter processing on the image to be output that corresponds to the region specified by the region specifying information. The filter processing unit 111 corrects the sharpness of the image to be output in such a manner that the image is satisfactorily reproduced when the image is output to the plotter 56. Specifically, by referring to the image-region separation result contained in the appendant information on the image data, the filter processing unit 111 performs a sharpening process or a smoothing process. For example, the filter processing unit 111 performs the sharpening process, on a text region, for sharpening text to increase the degree of the readability and performs the smoothing process, on a picture region, to smoothen the image. To enhance reusability of the image data, the filter processing unit 103 included in the first image processing apparatus 52 corrects, for each line group, an MTF characteristic value such that it has a predetermined MTF characteristic value that is set in advance. In contrast, the filter processing unit 111 included in the second image processing apparatus 66 performs processing according to a purpose of a user. For example, if the user specifies the text mode as the image quality mode, the degree of the sharpening process is increased, whereas, if the user specifies the photographic mode, the degree of the smoothing process is increased. Then, the filter processing unit 111 outputs image data to be output that represents the corrected image to be output.

For the image data to be output that is output from the filter processing unit 111, the color conversion unit 112 performs color conversion, in accordance with the output destination. Furthermore, in the ACS mode, in accordance with the reliability determination result determined by the CPU 53, if the CPU 53 determines that the first color determination result is unreliable, the color conversion unit 112 performs color conversion, which is performed in accordance with the output destination and by using the second color determination result, on the image data to be output. In other cases, the color conversion unit 112 performs color conversion, which is performed in accordance with the output destination and by using the first color determination result. For example, if the image forming apparatus 50 performs a copy operation and if the output destination is the plotter 56, the color conversion unit 112 performs color conversion by converting an image data of RGB each of 8 bits to an image data of 8 bits each of CMTK or of o bits of only K of a color space in the plotter 56. The color conversion is performed in accordance with the reliability determination result determined by the CPU 53 and by using the first color determination result contained in the appendant information or by using the second color determination result that is output from the second color determining unit 117. For example, if an image is specified to be output with a magnification of 200%, because the CPU 53 determines that the first color determination result is unreliable, the color conversion unit 112 performs color conversion using the second color determination result. If the first color determination result is determined to be reliable, the color conversion unit 112 performs the color conversion using the first color determination result. Furthermore, if the image forming apparatus 50 is performing a delivery scanner operation and an output target is an external device such as the PC 63, in accordance with the reliability determination result determined by the CPU 53, using the first color determination result contained in the appendant information or using the second color determination result that is output from the second color determining unit 117, the color conversion unit 112 performs color conversion by converting the image data from, for example, an image data of 8 bits each of RGB of a CIE-RGB space to an image data of 8 bits of grayscale or 8 bits each of RGB of an Adobe-RGB color space, which is suitable for monitor displaying. Here, the Adobe-RGB color space is described as an example; however, it is also possible to convert the image data to another standard color space, such as an sRGB color space.

If an image is enlarged or reduced, in accordance with the magnification specified via the operation display device 57, the resolution conversion unit 113 performs a resolution conversion (magnification change process) on the image data to be output that is output from the color conversion unit 112. Then, the resolution conversion unit 113 outputs the converted image data to be output. If the image is not enlarged or reduced, the resolution conversion unit 113 outputs image data to be output, which is output from the color conversion unit 112, without performing the resolution conversion. For the image data to be output, the gamma conversion unit 114 converts the tone characteristic of an image in accordance with the characteristic of the output destination to which the image is output. If the output destination is the plotter 56, the gamma conversion unit 114 converts, in accordance with the output characteristic of the plotter 56, the tone characteristic of an image in such a manner that the tone of the image is adequately maintained. Then, the resolution conversion unit 113 outputs the converted image data to be output. The halftone processing unit 115 performs a tone number conversion process, in accordance with the tone processing capacity of the plotter 56, on the image data to be output of 8 bits each of CMYK or on the image data to be output of 8 bits of K, which is output from the resolution conversion unit 113. For example, using an error diffusion method that is one of pseudo halftone processes, the halftone processing unit 115 performs a tone number conversion process by converting image data to be output of 8 bits each of CMYK or K, which is output from the resolution conversion unit 113 to image data of 2 bits each of CMYK or K. Then, the halftone processing unit 115 outputs the processed image data to be output. If the image to be output is a multi-level image, the halftone processing unit 115 outputs, without performing processing, the image data to be output that is output from the resolution conversion unit 113. For the image data to be output that is output from the halftone processing unit 115, in accordance with the output destination of the image, the format conversion unit 116 performs a format conversion such as JPEG compression or MMR compression.

<Copying Process>

Figure 7A:
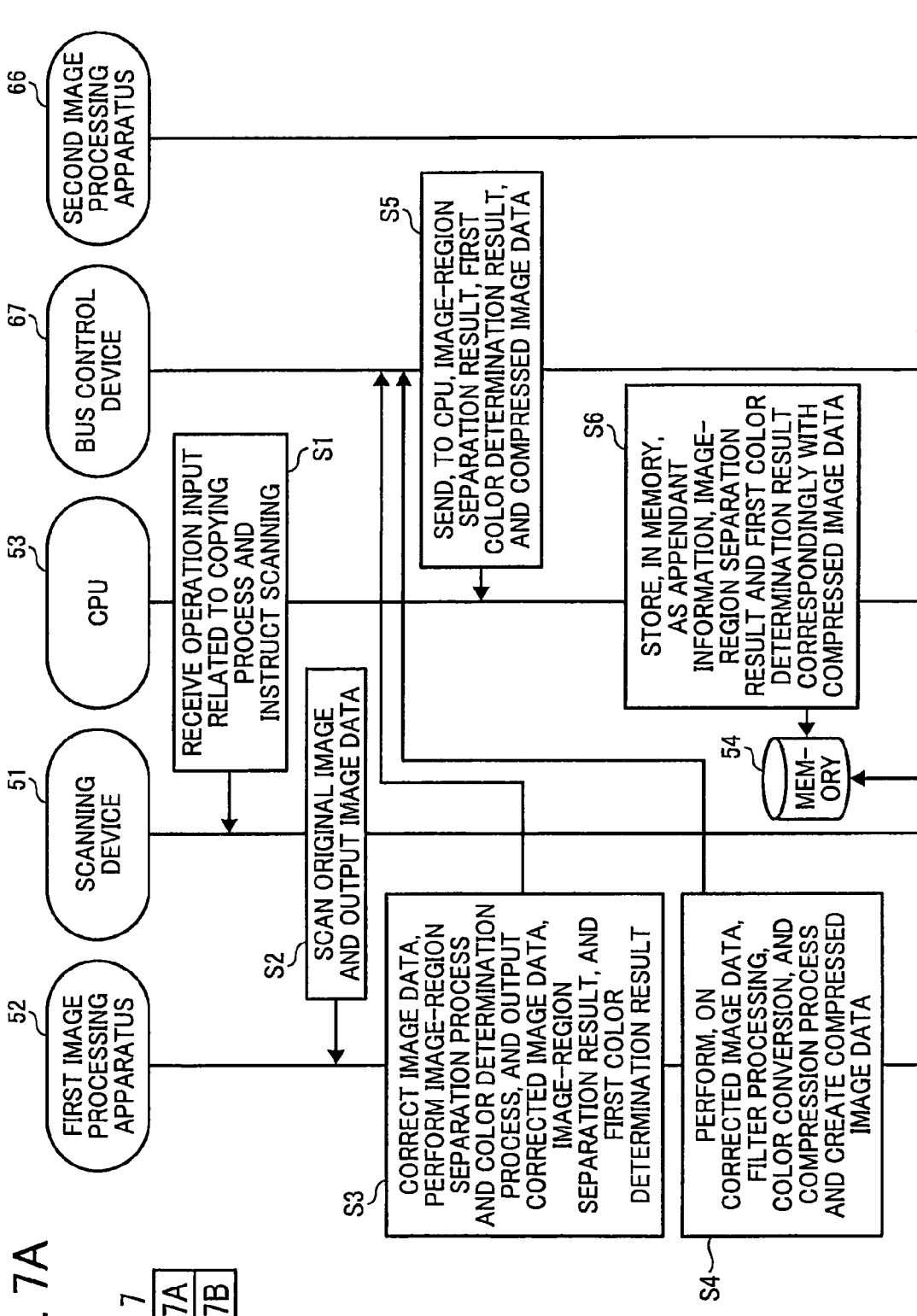
FIG. 7 is a flowchart illustrating the flow of a copying process performed by the image forming apparatus 50 according to the first embodiment.

In the following, the flow of the copying process performed by the image forming apparatus 50 according to the first embodiment will be described with reference to FIG. 7. Using the operation display device 57, a user places the original on the scanning device 51 and then performs an operation input related to setting of a copying operation and an operation input that instructs the copying operation to be commenced. At this time, regarding setting of the copying operation, it is possible to specify a magnification, the output size, an image quality mode, or the like. Furthermore, at this time, a user also performs an operation input to set the ACS mode in which an image to be output is automatically determined to be a chromatic image or an achromatic image. In accordance with the operation input from the user, the operation display device 57 creates a control command for setting the copying operation or the commencement of the copying operation and outputs the control command to the CPU 53 via the general-purpose standard I/F 78. The CPU 53 receives the control command that is created in accordance with the operation input; reads, from the ROM 61, various kinds of programs; and, in accordance with the control command, performs a setting or processing necessary for the copying operation. First, the CPU 53 instructs the scanning device 51 to read the original image (Step S1). In accordance with the instruction, the scanning device 51 reads the original image; creates RGB image data representing the original image; and outputs the RGB image data (Step S2). The image data that is output is input to the gamma conversion unit 102, the image-region separation unit 101, and the first color determining unit 100, which are in the first image processing apparatus 52. As described above, the gamma conversion unit 102 corrects the input image data and outputs the corrected image data. As described above, the image-region separation unit 101 recognizes a line-drawing region of the original image that is represented by data that is represented by the image data received from the scanning device 51; determines, using the ratio of a line-drawing region to a single-scanned original image, for each pixel, whether it belongs to a text region, a picture region, a chromatic region, or an achromatic region; and outputs the discrimination result as an image-region separation result. The first color determining unit 100 determines whether the original image represented by the input RGB image data is a chromatic image or an achromatic image and outputs the result (the first color determination result) (Step S3).

As described above, the filter processing unit 103 performs filter processing on the RGB image data that is output from the gamma conversion unit 102 and outputs the processed image data. The color conversion unit 104 performs color conversion on the image data that is output from the filter processing unit 103 and outputs the image data that has been subjected to the color conversion. The image compression unit 105 performs a compression process on the RGB image data that is output from the color conversion unit 104 and that has been subjected to color conversion and creates compressed image data (Step S4).

The bus control device 67 sends, to the CPU 53, the compressed image data output from the first image processing apparatus 52 and also sends, to the CPU 53, the above described image-region separation result and the first color determination result as the appendant information on the compressed image data (Step S5). The CPU 53 stores, in the memory 54, the image-region separation result and the first color determination result, which are the appendant information, correspondingly with the compressed image data (Step S6). Then, for the original image represented by the compressed image data, in accordance with the operation input that instructs the magnification or the output size, the CPU 53 determines an image (image to be output) that corresponds to a region to be output. In this case, because the ACS mode is set, the CPU 53 determines whether the magnification is specified, by the operation input, as a magnification equal to or greater than a predetermined first magnification (e.g., 200%) or determines whether an image specified to be output is a part of the original image. If the magnification is equal to or greater than the predetermined first magnification, or, if the image specified to be output is a part of the original image, the CPU 53 determines that the first color determination result is unreliable (Step S7).

Then, to allow the second image processing apparatus 66 to perform processing, the CPU 53 reads, from the memory 54, the compressed image data and the appendant information and sends them to the bus control device 67 (Step S8). The bus control device 67 outputs them to the second image processing apparatus 66. Furthermore, the CPU 53 outputs, to the second image processing apparatus 66 via the bus control device 67, the reliability determination result and the region specifying information that specifies a region that corresponds to the image to be output. In this way, the CPU 53 switches processing to the second image processing apparatus 66. Furthermore, if an operation input instructs at least one of the output size or the image mode, the CPU 53 sends, to the bus control device 67, setting instruction information. The bus control device 67 outputs the setting instruction information to the second image processing apparatus 66 (Step S9).

If the image decompression unit 110 according to the second image processing apparatus 66 receives the compressed image data via the CPU 53 and the bus control device 67, the image decompression unit 110 decompresses the compressed image data and outputs it. For the image represented by the RGB image data output from the image decompression unit 110, the second color determining unit 117 performs the color determination process for determining whether an image to be output that corresponds to a region specified by the region specifying information is a chromatic image or an achromatic image and outputs the result (the second color determination result). For the image data that is output from the image decompression unit 110, in accordance with the setting instruction information and image-region separation result that is included in the appendant information, the filter processing unit 111 performs filter processing on an image to be output that corresponds to a region specified by the region specifying information and outputs the processed image data to be output. Specifically, for the image to be output, if the image quality mode is specified as the text mode by the setting instruction information, the filter processing unit 111 increases the degree of the sharpening process. In contrast, if the photographic mode is specified, the filter processing unit 111 increases the degree of the smoothing process.

With respect to the image data to be output of 8 bits each of RGB output from the filter processing unit 111, in accordance with the reliability determination result sent from the CPU 53, using the first color determination result contained in the appendant information or the second color determination result that is output from the second color determining unit 117, the color conversion unit 112 performs color conversion in accordance with the color space of the plotter 56. Specifically, if the first color determination result is determined to be unreliable and the second color determination result is a chromatic image or if the first color determination result is determined to be reliable and the first color determination result is a chromatic image, the color conversion unit 112 performs color conversion, on the image data to be output, from the image data of 8 bits each of RGB to the image data of 8 bits each of CMYK. Furthermore, if the first color determination result is determined to be unreliable and the second color determination result is an achromatic image or if the first color determination result is determined to be reliable and the first color determination result is an achromatic image, the color conversion unit 112 performs color conversion, on the image data to be output, from 8-bit RGB image data to 8-bit K image data.

If the magnification is other than 100%, in accordance with the magnification, the resolution conversion unit 113 changes the magnification of the image data to be output that is output from the color conversion unit 112 and outputs, to the gamma conversion unit 114, the converted image data to be output. In accordance with the characteristic of the output destination to which the image is output, the gamma conversion unit 114 converts the tone characteristic of the image and outputs the converted image data to be output. For the image data to be output that is output from the resolution conversion unit 113, the halftone processing unit 115 appropriately performs a tone number conversion process, in accordance with whether the image to be output is a binary image or a multi-level image, and outputs the image data to be output in accordance with whether the processing is performed or not. Because the purpose of outputting the image to be output is to output it on a sheet of transfer paper, the format conversion unit 116 outputs, without performing processing, the image data to be output that is output from the halftone processing unit 115 (Step S10). The CPU 53 receives, via the bus control device 67, the image data to be output that is output from the format conversion unit 116 and stores it in the memory 54 (Step S11). Subsequently, the CPU 53 reads the image data to be output from the memory 54 and sends the image data to the plotter 56 via the plotter I/F device 55 (Step S12). When the plotter 56 receives the image data to be output, the plotter 56 creates, in accordance with a CMYK color space or a K color space that is a color space of the image data to be output, the image to be output that is represented by the image data to be output and outputs it on the sheet of transfer paper. Accordingly, the image to be output is copied.

For example, if the magnification is 100%, i.e., if an equal-magnification copying process is performed, the first color determination result is determined to be reliable. Accordingly, in accordance with the first color determination result, the image to be output is output as a chromatic image. Furthermore, if the magnification is 200%, the first color determination result is determined to be unreliable, in accordance with the second color determination result, as illustrated in FIG. 5, and the image to be output is output as an achromatic image.

<Scanner Delivery Process>

Figure 8A:
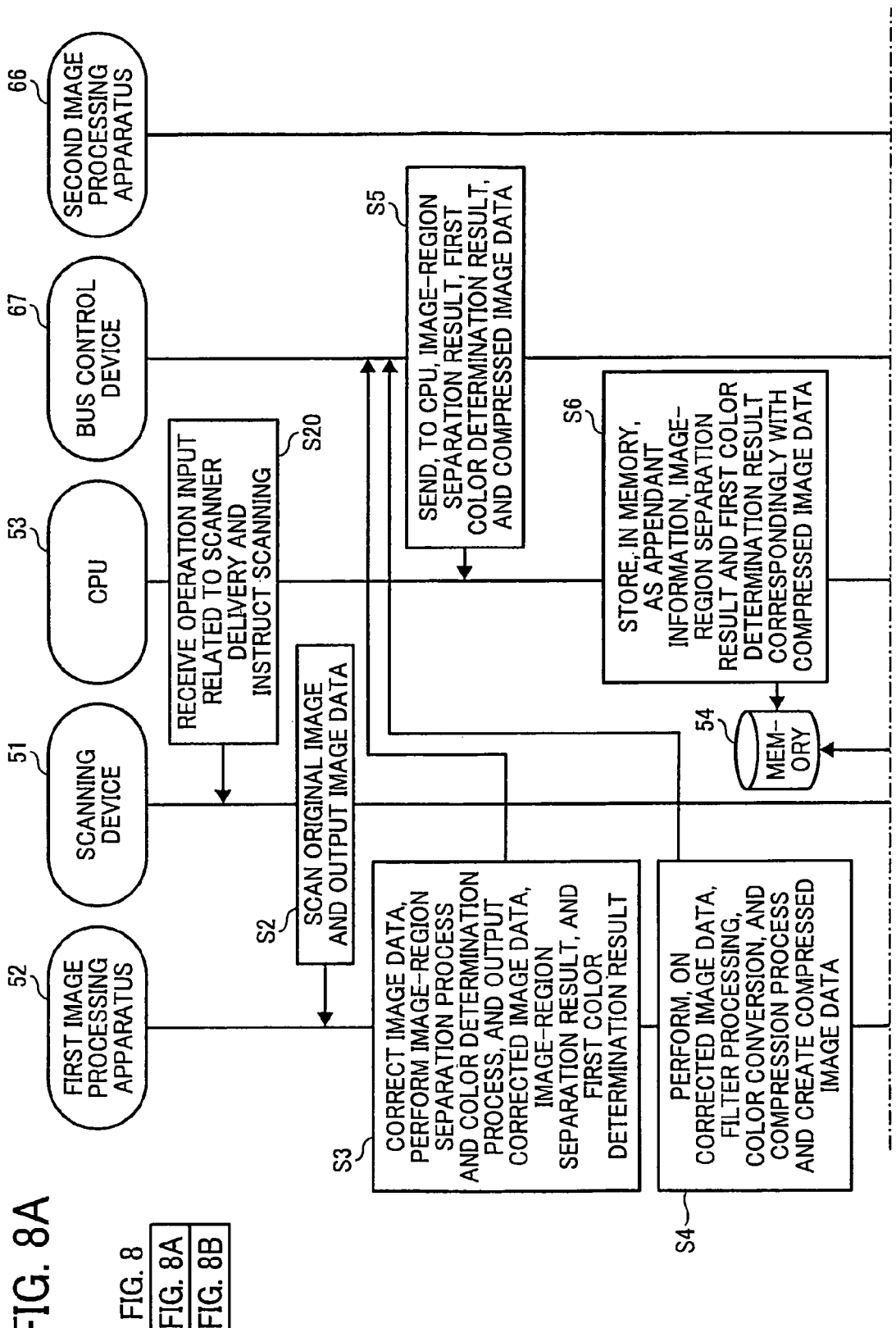
FIG. 8 is a flowchart illustrating the flow of a scanner delivery process performed by the image forming apparatus 50 according to the first embodiment.

In the following, the flow of a scanner delivery process performed by the image forming apparatus 50 will be described with reference to FIG. 8. First, using the operation display device 57, a user places the original on the scanning device 51 and then performs an operation input related to setting a scanner delivery and an operation input that instructs the scanner delivery to be commenced. Here, with respect to setting of the scanner delivery, it is possible to specify an external device to which image data is delivered (the PC 63, in this case), the resolution of an image to be delivered, a scanning region, or the like. Here also, an operation input to set the ACS mode is performed. In accordance with the operation input from the user, the operation display device 57 creates a control command for setting the scanner delivery or the commencement of the scanner delivery and outputs the control command to the CPU 53 via the general-purpose standard I/F 78. The CPU 53 receives the control command that is created in accordance with the operation input; reads, from the ROM 61, various kinds of programs; and, in accordance with the control command, performs a setting or processing necessary for the scanner delivery. First, the CPU 53 instructs the scanning device 51 to scan the original image (Step S20). In accordance with the instruction, the scanning device 51 then reads the original image; creates RGB image data representing the original image; and outputs the RGB image data (Step S2). The image data that is output is input to the gamma conversion unit 102, the image-region separation unit 101, and the first color determining unit 100 that are included in the first image processing apparatus 52. Each unit processes the input image data in a manner like that of the copying process described above (Steps S3 to S4). The compressed image data, the image-region separation result, and the first color determination result, which are described above, are input to the CPU 53 via the bus control device 67. Processes performed at Steps S5 to S7 are the same as those performed in the copying process described above.

Subsequently, at Step S7, for the original image represented by the compressed image data, in accordance with an operation input that instructs what the resolution of an image to be delivered or a scanning region is to be, the CPU 53 determines an image to be output. If there is no instruction about the resolution of an image to be delivered or a scanning region, the image to be output corresponds to the entire original image. In this case, because the ACS mode is set, the CPU 53 determines whether the magnification is specified, by the operation input, to be equal to or greater than a predetermined first magnification (e.g., 200%), or, whether an image specified to be output is a part of the original image. If the magnification is equal to or greater than the predetermined first magnification, or, if the image specified to be output is a part of the original image, the CPU 53 determines that the first color determination result is unreliable. Then, the CPU 53 performs Steps S8 and S9 as described above.

Then, at Step S10, first, after receiving the compressed image data via the CPU 53 and the bus control device 67, the image decompression unit 110 in the second image processing apparatus 66 decompresses the compressed image data and outputs it. For the image represented by the RGB image data that is output from the image decompression unit 110, the second color determining unit 117 performs the color determination process of determining whether an image to be output that corresponds to a region specified by the region specifying information is a chromatic image or an achromatic image and outputs the result (the second color determination result). For the RGB image data that is output from the image decompression unit 110, the filter processing unit 111 performs filter processing on an image to be output that corresponds to a region specified by the region specifying information and outputs the processed image data to be output. For the 8-bit RGB image data to be output that is output from the filter processing unit 111, in accordance with the reliability determination result that is sent from the CPU 53, using the first color determination result contained in the appendant information or the second color determination result that is output from the second color determining unit 117, the color conversion unit 112 performs color conversion in accordance with the color space of the PC 63 that is an external device to be delivered. Specifically, if the first color determination result is determined to be unreliable and the second color determination result is a chromatic image or if the first color determination result is determined to be reliable and the first color determination result is a chromatic image, the color conversion unit 112 performs color conversion, on the image data to be output, from 8-bit RGB image data to multi-level RGB image data. Furthermore, if the first color determination result is determined to be unreliable and the second color determination result is an achromatic image or if the first color determination result is determined to be reliable and the first color determination result is an achromatic image, the color conversion unit 112 performs color conversion, on the image data to be output, from 8-bit RGB image data to multi-level grayscale image data or to binary and monochrome image data.

The resolution conversion unit 113 outputs, to the gamma conversion unit 114, the image data to be output that is output from the color conversion unit 112. In accordance with the characteristic of the output destination to which the image is output, the gamma conversion unit 114 converts the tone characteristic of the image and outputs the converted image data to be output. For the image data to be output that is output from the resolution conversion unit 113, in accordance with whether the image to be output is a binary image or a multi-level image, the halftone processing unit 115 appropriately performs a tone number conversion process and outputs the image data to be output according to whether the processing is performed or not. Because the scanner delivery is used for the purpose of outputting the image to be output, the format conversion unit 116 performs format conversion on the image data to be output that is output from the halftone processing unit 115 and outputs the converted image data to be output. For example, if the first color determination result or the second color determination result, which is used in accordance with the reliability determination result that is sent from the CPU 53, indicates that the image to be output is a chromatic image, the format conversion unit 116 performs JPEG compression on the image data to be output and outputs the compressed image data to be output. Furthermore, if the first color determination result or the second color determination result, which is used in accordance with the reliability determination result that is sent from the CPU 53, indicates that the image to be output is an achromatic image and also, if the image data to be output is subjected to color conversion and is converted to binary monochrome image data, the format conversion unit 116 performs MMR compression on the image data to be output; creates TIFF-format image data to be output; and outputs it. Furthermore, if the first color determination result of the second color determination result, which is used in accordance with the reliability determination result that is sent from the CPU 53, indicates that the image to be output is an achromatic image and the image data to be output is subjected to color conversion to grayscale, the format conversion unit 116 performs JPEG compression on the image data to be output and outputs the compressed image data to be output. The CPU 53 receives, via the bus control device 67, the image data to be output that is output from the format conversion unit 116 and stores it in the memory 54 (Step S11). Then, the CPU 53 reads the image data to be output from the memory 54 and sends, via the external I/F device 59, the image data to the PC 63, which is an external device (Step S21).

<Image Storing Process>

In the following, the flow of a case in which the image forming apparatus 50 performs only an image storing process without performing the copying process nor the scanner delivery process will be described with reference to FIG. 9. Using the operation display device 57, a user places the original on the scanning device 51 and then performs an operation input related to setting, such as a desired image quality mode, and an operation input that instructs the original image to be scanned and that instructs the saving to be started of the image. At this stage, the original image is scanned under general conditions in such a manner that data are reusable for various purposes after an image is stored. Specifically, the magnification for scanning the original image is set to equal-magnification. In accordance with the operation input from the user, the operation display device 57 creates a control command for setting the image quality mode or an instruction to start scanning the original image and outputs the control command to the CPU 53 via the general-purpose standard I/F 78. The CPU 53 receives the control command that is created in accordance with the operation input; reads various kinds of programs from the ROM 61; executes the programs; and sequentially performs, in accordance with the control command, a setting or processing necessary for scanning the original image (Step S30). Processes performed at Steps S2 to S4 are the same as those performed in the scanner delivery process described above. At Step S31, the bus control device 67 associates the image-region separation result and the first color determination result, as the appendant information, with the compressed image data, all of which are output from the first image processing apparatus 52, and stores them in the HDD 68.

<Copying Process and Image Storing Process>

In the following, the flow of a case in which the image forming apparatus 50 simultaneously performs the copying process and the image storing process will be described with reference to FIG. 10. Processes performed at Steps S1 to S8 are the same as those performed in the copying process described above. After Step S8, at Step S40, the bus control device 67 sends, to the second image processing apparatus 66, the compressed image data and the appendant information, as well as the reliability determination result and the region specifying information. At this time, the bus control device 67 stores, in the HDD 68, the image-region separation result and the first color determination result, as appendant information, and also stores therein the compressed image data. The process at Step S10 and the subsequent processes are the same as those performed in the copying process described above. Accordingly, the image forming apparatus 50 is able to simultaneously perform the copying process and the image storing process.

<Scanner Delivery Process and Image Storing Process>

In the following, the flow of a case in which the image forming apparatus 50 simultaneously performs the scanner delivery process and the image storing process will be described with reference to FIG. 11. Processes performed at Steps S20, and S2 to S8 are the same as those performed in the scanner delivery process described above. The process at Step S40 is the same as the process that is simultaneously performed in the copying process and the image storing process. The process at Step S10 and the subsequent processes are the same as those performed in the scanner delivery process described above. Accordingly, the image forming apparatus 50 is able to simultaneously perform the scanner delivery process and the image storing process.

<Reusing a Stored Image>

In the following, a process performed in a case in which the image forming apparatus 50 reuses the image data stored in the HDD 68 will be described. As described above, the image data, which is stored in the HDD 68, is associated with the appendant information. Even if time has elapsed after the original image is stored, the image data of the original data are reusable. First, the CPU 53 in the image forming apparatus 50 displays a screen, as a user interface that is used when the image data is reused, on the operation display device 57. For example, in accordance with the operation from a user, the CPU 53 displays a screen that shows the data name of the image data that is stored in the HDD 68 and that has been stored when an operation is performed; shows creation date/time or update date/time of the image data; and shows a thumbnail image that is a reduced image of the image represented by the image data. By referring to the screen displayed on the operation display device 57, the user is able to check images stored in the HDD 68. Then, using the screen on the operation display device 57, the user performs an operation input that selects image data that the user wants to reuse; an operation input that instructs a reuse process performed on the image data to be commenced; or an operation input that instructs a setting related to the reuse process or a desired image quality mode. The reuse process includes, for example, a process for outputting an image on transfer paper or a scanner delivery process. In addition to these processes, although explanation will be omitted here, other processes such as facsimile communication can be included in this process.

First, the flow of a case in which the image forming apparatus 50 performs an output process, as a reuse process, for outputting an image on a sheet of transfer paper will be described with reference to FIG. 12. First, the CPU 53 in the image forming apparatus 50 displays a screen, as a user interface that is used when the image data is reused, on the operation display device 57 (Step S50). On the screen, using the operation display device 57, as the reuse process, the user performs an operation input related to setting of the output of the image data to be on the sheet of transfer paper and an operation input that instructs the outputting of the image data on the sheet of transfer paper to be started. A process for outputting the image on the sheet of transfer paper is substantially the same process as that performed in the copying process. Accordingly, at this stage, regarding setting of the output of the image data to be on the sheet of transfer paper, as described in the copying process, it is possible to specify a magnification, the output size, an image quality mode, or the like. Furthermore, in this case, the ACS mode is set. In accordance with an operation input from the user, the operation display device 57 creates a control command for setting an output of an image to be on the sheet of transfer paper or for the commencement of the output of the image on the sheet of transfer paper and outputs the control command to the CPU 53 via the general-purpose standard I/F 78. The CPU 53 receives the created control command that is created in accordance with the operation input; reads, from the ROM 61, various kinds of programs; and, in accordance with the control command, performs setting and processing necessary for outputting on the sheet of transfer paper. Then, the CPU 53 instructs the bus control device 67 to read the image data (Step S51). In accordance with the instruction, the bus control device 67 reads, from the HDD 68, the image data and the appendant information and sends them to the CPU 53 (Step S52). Because the ACS mode is set in this case, at Step S7, in a similar manner as in the copying process, using the image data, the appendant information, and the magnification, the CPU 53 determines an image to be output and performs reliability determination on the first color determination result. The subsequent processes from Steps S8 to S12 are the same as those performed in the copying process.

Furthermore, the flow of a case in which the image forming apparatus 50 performs, as a reuse process, a scanner delivery process will be described with reference to FIG. 13. First, the CPU 53 in the image forming apparatus 50 displays the screen, as a user interface that is used when the image data is reused, on the operation display device 57 (Step S50). On the screen, using the operation display device 57, as the reuse process, the user performs an operation input that instructs the commencement of the scanner delivery or an operation input related to setting of a desired image quality mode. Here, regarding setting of the scanner delivery, as described above in the scanner delivery process, an external device to be delivered to (the PC 63 in this case), the resolution of the image to be delivered, a scanning region, and the like are specified. In accordance with the operation input from the user, the operation display device 57 creates a control command for setting the scanner delivery or the commencement of the scanner delivery and outputs the control command to the CPU 53 via the general-purpose standard I/F 78. The CPU 53 receives the control command that is created in accordance with the operation input; reads, from the ROM 61, various kinds of programs and executes them; and sequentially performs, in accordance with the control command, setting and processing necessary for the scanner delivery process. Then, the CPU 53 instructs the bus control device 67 to read the image data (Step S60). In accordance with the instruction, the bus control device 67 reads, from the HDD 68, the image data and the appendant information and sends them to the CPU 53 (Step S52). Because the ACS mode is set in this case, at Step S7, as described above in the scanner delivery process, in accordance with the resolution of the image to be delivered or a scanning region, the CPU 53 determines the image to be output and performs the reliability determination on the first color determination result.

For example, it is assumed that in the copying process and the image storing process, after an A3-size original image is copied to an A3-size sheet of transfer paper using an equal-magnification copying process, the image data thereof that is stored in the HDD 68 is subjected to a scanner delivery process. It is also assumed that, when the original image is copied, 600 dpi is specified as the resolution and a horizontally oriented sheet of A4 paper is specified as the scanning region. In such a case, for example, for the original image illustrated in FIG. 3, a region to which an image to be output is within the region indicated by the solid line in FIG. 5. In this case, a color determination result indicating that the image to be output is an achromatic image is obtained. The process of Step S8 and the subsequent processes are the same as those described in the scanner delivery process.

As described above, for the image data that is input from the scanning device 51, the first image processing apparatus 52 unifies the properties of the image data in such a manner that a device to which the image data is output, such as the plotter 56 or the PC 63 that is an external device, is able to use the image data; and stores, in the HDD 68, the image data whose properties are unified. At this time, for the image data that is input from the scanning device 51, the first image processing apparatus 52 performs the image-region separation process or the color determination process and stores, together with the processed image data in the HDD 68, the image-region separation result or the color determination result as the appendant information. Then, when a user reuses the image data that is stored in the HDD 68 in the image forming apparatus 50, the second image processing apparatus 66 performs processing on the image data to obtain the image data with the properties suitable for the device to which the image data is output, such as the plotter 56 or the PC 63. At this time, if only a part of an image represented by the stored image data is output, there may be a case in which the color determination result contained in the appendant information is unreliable. Accordingly, in the ACS mode, using the color determination process result performed by the second image processing apparatus 66, color conversion is performed.

Figure 14:
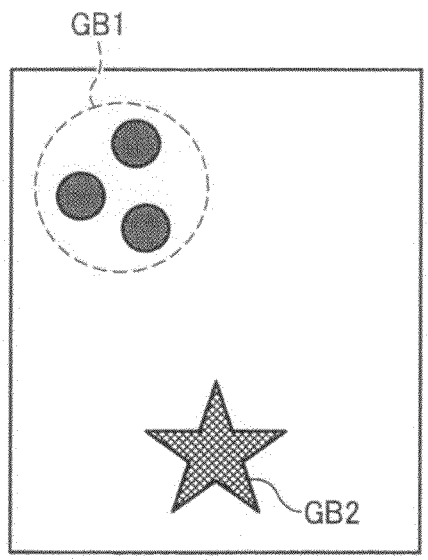
FIG. 14 is a schematic diagram illustrating an example image that is output by processing the original image illustrated in FIG. 3 using a magnification of 100%.
Figure 15:
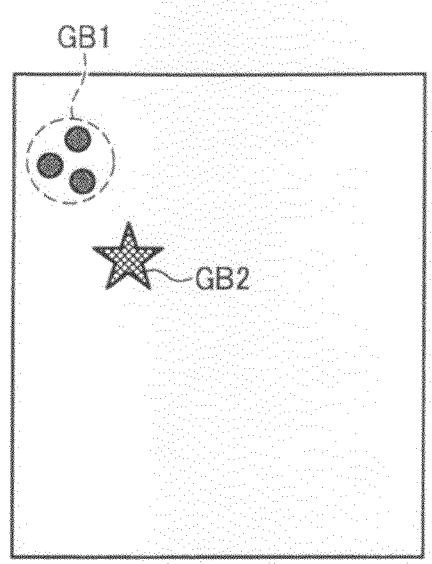
FIG. 15 is a schematic diagram illustrating an example image that is output by processing the original image illustrated in FIG. 3 using a magnification of 50%.

A specific example will be used here in which the original image illustrated in FIG. 3 is output on a sheet of transfer paper. FIGS. 14 and 15 are schematic diagrams illustrating example images that are output by processing the original image using a magnification of 100% (equal-magnification), and 50% (reduction), respectively. Furthermore, an example image that is output by processing the original image using a magnification of 200% (enlargement) is illustrated in FIG. 5. In the example illustrated in FIG. 3, as described above, the image portion GB1 is an achromatic image, the image portion GB2 is a chromatic image, and the original image is a chromatic image that contains a chromatic image and an achromatic image. Accordingly, in the examples in FIGS. 14 and 15, the image to be output is an image that contains the entire original image and is, similarly to the original image, a chromatic image that contains both a chromatic image and an achromatic image. In contrast, as illustrated in FIG. 5, if an image that contains only the image portion GB1, which is an image that is a part of the original image, is output, an image to be output does not contain a chromatic region, and therefore, is an achromatic image. Furthermore, even when an image is copied using a magnification of 100% (equal-magnification), if the image is output on a sheet of transfer paper whose size is smaller than that of the original image (e.g., a case in which an A3-size original is output on an A5-size sheet of transfer paper), similarly to the image illustrated in FIG. 5, the image to be output is consequently a part of the original image. In this way, if the image to be output is a part of the original image and a size difference between the original image and the image to be output is equal to or greater than a predetermined magnitude, the first color determination result that is determined when the original image is scanned may be different from the second color determination result on the actual image to be output. In such a case, in the example illustrated in FIG. 5, when an image to be output subjected to color conversion using the first color determination result is output, the image to be output is output using four CMYK colors even though the image is an achromatic image. Thus the processing cost and the processing time are wasted. In contrast, for example, when the first color determination result of an image in which the original image is processed using a magnification of 200% is stored, as appendant information, together with image data and when the original image is output with equal-magnification, if color conversion is performed using the first color determination result that is included in the appendant information, even though the image to be output is a chromatic image, the image is output using only the K color. In such a case, in practice, the image to be output does not have a suitable color, which may not meet the user's needs. However, in the first embodiment, it is determined whether the color determination process result, which is performed by the first image processing apparatus 52 when the original image is scanned, is reliable. If a size difference between the original image and the image to be output that is a part of the original image is equal to or greater than a predetermined magnitude, i.e., if a magnification is equal to or greater than the predetermined first magnification, the color conversion is performed using the color determination process result determined by the second image processing apparatus 66, instead of using that color determination process result. Accordingly, it is possible to perform the color conversion suitable for the image to be output that is to be actually output. As a result, while maintaining reliability with respect to the determination of the attribute of the image feature such as color determination, it is possible to reduce any wasted processing costs or processing time.

In the first embodiment, for the image data that is input from the scanning device 51, by unifying properties of the image data in such a manner that each output destination is able to use the image data, the first image processing apparatus 52 performs image processing suitable for storing image data in the output destination. At this time, the first image processing apparatus 52 converts a color space, from a color space obtained when the original image is scanned to a color space in accordance with each output destination in such a manner that the second image processing apparatus 66 easily performs the color space conversion (color conversion). Furthermore, the filter processing unit 103 performs a predetermined conversion in which frequency space conversion according to each output destination is easily performed (filter processing). In other words, by performing image processing in which image quality substantially the same as that of the original image is obtainable, the first image processing apparatus 52 outputs the image data. Accordingly, the reliability of the color determination process, which is performed by the second color determining unit 117 on such image data, rarely becomes too low. However, there may be a case in which, in accordance with a user's request, the first image processing apparatus 52 performs an image editing process for adjusting the image quality of the original image. In such an image editing process, if the degree of the image quality adjustment is high, the reliability of the color determination process performed by the second color determining unit 117 with respect to the image data that has been subjected to image editing process may be significantly lowered. An example thereof will be described in a next embodiment.

Second Embodiment

In the following, a second embodiment of the image processing apparatus and the image processing program will be described. Parts having the same configuration as those in the first embodiment described above are assigned the same reference numerals and therefore descriptions thereof are omitted.

In the second embodiment, a user is able to set, via the operation display device 57, the degree of the image sharpness, i.e., the degree of enhancement of a filter. If a user requests an image that is clearer (sharper) than the scanned original image, the user performs a setting to enhance the sharpness of the image. By storing, in the HDD 68, the image data representing the original image subjected to a sharpening process in which the degree of the sharpness is enhanced, when the image data is reused, the user does not need to set the setting, every time the image data is reused, to enhance the sharpness of the image to be output. In accordance with the sharpness (the degree of the enhancement) that is set via the operation display device 57, the filter processing unit 103 in the first image processing apparatus 52 performs, on the RGB image data that is output from the gamma conversion unit 102, filter processing, such as a sharpening process, and outputs the processed image data. In the sharpening process, the higher the degree of the sharpness is, the higher the enhancement level is made. The bus control device 67 sends, to the CPU 53, the compressed image data that is output from the first image processing apparatus 52. In addition to the image-region separation result and the first color determination result, which are used as the appendant information on the compressed image data, the bus control device 67 also sends, to the CPU 53, filter information, as appendant information, indicating that the filter processing unit 103 has performed the sharpening process. After the CPU 53 receives the compressed image data and the appendant information, if the appendant information contains the filter information, the CPU 53 determines that the color determination result (the second color determination result) performed by the second color determining unit 117 is unreliable.

The second image processing apparatus 66 receives, via the CPU 3 and the bus control device 67, the compressed image data and the appendant information thereon; the reliability determination result; and the region specifying information, which are subjected to various kinds of processes including a sharpening process in the first image processing apparatus 52 and are output therefrom. The configuration of the second image processing apparatus 66 is substantially the same as that in the first embodiment. However, if the reliability determination result performed by the CPU 53 is that the second color determination result is unreliable, the second color determining unit 117 does not perform the color determination process. In a similar manner as in the first embodiment, for the image data to be output that is output from the filter processing unit 111, the color conversion unit 112 performs color conversion in accordance with an output destination. However, in the ACS mode, if the reliability determination result performed by the CPU 53 is that the second color determination result is unreliable, the color conversion unit 112 performs, using the first color determination result, color conversion in accordance with an output destination. The method of performing color conversion is the same as that described in the first embodiment.

With the configuration described above, it is possible to maintain reliability with respect to the determination of the attributes of the image features, such as color determination. A possible significant problem of the color determination in the ACS mode is, when the original image is scanned, if color shift occurs near text or a line represented in a black color (hereinafter, referred to as a "black text/line portion"), it is hard to distinguish the black text/line portion from a line represented in a color other than black (hereinafter, referred to as a "true color line"). When a sharpening process is performed, if an edge is enhanced, a region in which the color shift occurs near the black text/line portion is enhanced, causing the image to be colored more brightly than before the region is enhanced. If circuits having the same configuration are used in the first color determining unit 100 and the second color determining unit 117, when compared with the color shift of the image represented by the image data that is input to the first color determining unit 100, the image represented by the image data that is input to the second color determining unit 117 is colored more brightly. Accordingly, the capacity of the color determination process performed by the second color determining unit 117 is degraded. In other words, depending on a color determination parameter, the color shift of the black text/line portion, which is determined to be an achromatic image by the first color determining unit 100, is determined to be a chromatic image by the second color determining unit 117. Furthermore, if a color determination parameter is set such that a black text/line portion that becomes brighter is infallibly determined to be an achromatic image, in some cases, a true chromatic image, which is correctly determined by the first color determining unit 100, may be erroneously determined to be an achromatic image by the second color determining unit 117. In practice, circuits having the same configuration may not used for both the first color determining unit 100 and the second color determining unit 117. In such a case, a color determination process performed by the second color determining unit 117 is also more disadvantageous in terms of its performance.

In this way, if a sharpening process of largely sharpening an image by a user's intentional image editing is performed, the performance of the color determination process by the second color determining unit 117 is significantly degraded. In such a case, color conversion may possibly be performed using an erroneous color determination result, which wastes time or toner, or requires a user to perform an operation input that manually instructs a color mode or a monochrome mode to be switched so as to perform the processing again. Accordingly, in such a case, it is useful for a user not to use the color determination result treating it as an unreliable result when the result is determined by the second color determining unit 117.

When the compressed image data stored in the HDD 68 is reused, the second color determining unit 117, instead of CPU 53, may determine whether the filter information is contained in the appendant information that is stored together with the compressed image data. Furthermore, the second color determining unit 117 may perform the color determination process itself, and the color conversion unit 112 may determine whether to use the first color determination result or the second color determination result.

Furthermore, if the filter information is contained in the appendant information that is stored together with the compressed image data when the compressed image data stored in the HDD 68 is reused, it is possible to configure the operation display device 57 such that a user cannot set the ACS mode. Specifically, if the first image processing apparatus 52 performs a sharpening process, the color conversion using the color determination result is not performed.

Alternatively, even when the operation display device 57 is configured such that a user is able to set the ACS mode, when the ACS mode is set, the operation display device 57 may be configured to display a warning message that indicates that there is a high possibility that color determination in the ACS mode is erroneous. With this configuration, it is possible to prompt the user to manually set the color mode before the user is disadvantaged.

Furthermore, filter information also may indicate, together with the completion of the sharpening process, the degree of the sharpness. In such a case, when the compressed image data stored in the HDD 68 is reused, if the filter information is contained in the appendant information that is stored together with the compressed image data and the degree of the sharpness is equal to or greater than the predetermined first degree of sharpness, the second color determining unit 117 may be configured not to perform the color determination process. The degree of the sharpness is set in accordance with the operation input via the operation display device 57. The degree of the predetermined first degree of sharpness may be obtained, for example, by experiment and determined in advance.

Alternatively, when the compressed image data stored in the HDD 68 is reused, if the filter information is contained in the appendant information that is stored together with the compressed image data, color conversion may be performed using the first color determination result. For the original image illustrated in FIG. 3, as described above, if an image is output with a magnification of 200%, as in the example illustrated in FIG. 5, the image to be output is an achromatic image; however, the first color determination result indicates that the image is a chromatic image, which is different from the image that is actually output. However, in many other modes of reuse, it is preferable that the image to be output is determined to be a chromatic image. For example, if an image is enlarged using a magnification of 115%, which is a generally and frequently used magnification, for the original image illustrated in FIG. 3, an image containing a part of the image portion GB2 that is a chromatic image is output. In such a case, it is preferable that the image is determined to be a chromatic image, as in the example illustrated in FIG. 16. Even when a magnification of less than 115% is used, it is also preferable that the image is determined to be a chromatic image. In principle, when processing is performed using a magnification of 200%, it is difficult to perform the color determination using only the first color determining unit 100. However, in a state in which the capacity of the color determination process of the second color determining unit 117 is significantly degraded due to the high degree of an image editing process, it is more advantageous for a user to use the color determination process result determined by the first color determining unit 100, which is performed when the original image is scanned. When the compressed image data is reused, it is more preferable that a user is able to select, using the operation display device 57, any of the methods described above.

Furthermore, when an image is output using a predetermined second magnification (for example 50%) that is smaller than 100%, it is possible to perform color conversion using the first color determination result. In such a case, because all of the images that have been subjected to a color determination process by the first color determining unit 100 are output, the first color determination result is determined to be reliable. Accordingly, in this case, the color conversion unit 112 in the second image processing apparatus 66 is configured to perform the color conversion using the first color determination result.

However, even when an image processed using a magnification of 100% (equal-magnification) is output, if a size difference between the original image and a part of the original image that is to be output is equal to or greater than a predetermined magnitude, i.e., if the output size specified by the operation input is smaller than that of the original image or if a part of the original image is specified as an image to be output, as described in the first embodiment, the first color determination result may be unreliable. Accordingly, in such a case, for example, the color conversion unit 112 does not perform color conversion using a color determination result.

When image processing such as a color processing is performed, there is no effect on the reliability of the first color determination result. Accordingly, as long as the first color determination result is reliable, the color conversion unit 112 in the second image processing apparatus 66 may perform color conversion using the first color determination result.

As described above, in the second embodiment, it is possible to perform filter processing suitable for the stored image data without receiving a specific setting from a user. The second color determination result is not used when the image feature of the original image is significantly changed, depending on the user's request, by performing filter processing in which image sharpness is significantly changed. This prevents the user from being disadvantaged.

Third Embodiment

In the following, a third embodiment of the image processing apparatus and the image processing program will be described. Parts having the same configuration as those in the first embodiment or the second embodiment described above are assigned the same reference numerals and therefore descriptions thereof are omitted.

In the third embodiment, a user is able to set, via the operation display device 57, the degree of the image smoothness. If a user requests an image that is smoother (softer) than the scanned original image, the user sets a setting to increase the smoothness of the image. By storing, in the HDD 68, the image data representing the original image subjected to a smoothing process in which the degree of the smoothness is increased, when the image data is reused, the user does not need to set the setting to increase the smoothness of the image to be output every time the image data is reused. In accordance with the degree of the smoothness that is set via the operation display device 57, the filter processing unit 103 in the first image processing apparatus 52 performs, on the RGB image data that is output from the gamma conversion unit 102, filter processing, such as a smoothing process, and outputs the processed image data. In the smoothing process, the smoothing level is increased in proportion to the degree of the smoothness. The bus control device 67 sends, to the CPU 53, the compressed image data that is output from the first image processing apparatus 52. In addition to the image-region separation result and the first color determination result, which are used as the appendant information on the compressed image data, the bus control device 67 also sends, to the CPU 53, filter information, as appendant information, indicating that the filter processing unit 103 has performed the smoothing process. After the CPU 53 receives the compressed image data and the appendant information, if the appendant information contains the filter information, the CPU 53 determines that the color determination result (the second color determination result) performed by the second color determining unit 117 is unreliable.

The second image processing apparatus 66 receives, via the CPU 53 and the bus control device 67, the compressed image data and the appendant information thereon; the reliability determination result; and the region specifying information, which are subjected to various kinds of processes including a sharpening process in the first image processing apparatus 52 and are output therefrom. The configuration of the second image processing apparatus 66 is substantially the same as that in the first embodiment. However, if the reliability determination result performed by the CPU 53 is that the second color determination result is unreliable, the second color determining unit 117 does not perform the color determination process. In a similar manner as in the first embodiment, for the image data to be output that is output from the filter processing unit 111, the color conversion unit 112 performs color conversion in accordance with an output destination. However, in the ACS mode, if the reliability determination result performed by the CPU 53 is that the second color determination result is unreliable, the color conversion unit 112 performs, using the first color determination result, color conversion in accordance with an output destination. The method of performing color conversion is the same as that described in the first embodiment.

With the configuration described above, it is possible to maintain reliability with respect to the determination of the attributes of the image features, such as color determination. A possible significant problem of the color determination in the ACS mode is, when the original image is scanned, if color shift occurs near a black text/line portion, it is hard to distinguish the black text/line portion from a true color line. When a smoothing process is performed, a region in which the color shift occurs near the black text/line portion or the true color line is smoothed. The color near a black text/line portion on a white background is less bright and chroma is reduced. However, if a color shift level is high, the color of that portion is not completely removed, and furthermore, there may be a case in which a portion that is white before the smoothing process is performed may become colored. Furthermore, if a strong smoothing process is performed on a true color line on a white background, the chroma of a light-colored line or an extremely thin line is significantly reduced. If a significantly strong smoothing process is performed, in some cases, depending on the color determination parameter setting, an image that includes a true color line or text represented by colors other than black (hereinafter, referred to as "color text") may not be determined to be a chromatic image. In contrast, if the color determination parameter is set in such a manner that an image is determined to be a chromatic image, a black text portion, which is less bright and is also colored, is erroneously determined to be a chromatic image. In such a case, the capacity of the color determination process performed by the second color determining unit 117 is significantly degraded. Accordingly, in such a case, it is useful for a user not to use the color determination result treating it as an unreliable result when the result is determined by the second color determining unit 117.

When the compressed image data stored in the HDD 68 is reused, the second color determining unit 117, instead of CPU 53, may determine whether the filter information is contained in the appendant information that is stored together with the compressed image data. Furthermore, the second color determining unit 117 may perform the color determination process itself, and the color conversion unit 112 may determine whether to use the first color determination result or the second color determination result.

Furthermore, when the compressed image data stored in the HDD 68 is reused, if the filter information is contained in the appendant information that is stored together with the compressed image data, the operation display device 57 may be configured such that a user is not able to set the ACS mode. Specifically, if the first image processing apparatus 52 performs smoothing process, the color conversion using the color determination result is not performed.

Alternatively, even when the operation display device 57 is configured such that a user is able to set the ACS mode, when the ACS mode is set, the operation display device 57 may be configured to display a warning message indicating that there is a high possibility that color determination in the ACS mode is erroneous. With this configuration, it is possible to prompt the user to manually set the color mode before a state becomes not useful for the user.

Furthermore, filter information may also indicate, together with the completion of the smoothing process, the degree of the smoothness. In such a case, when the compressed image data stored in the HDD 68 is reused, if the filter information is contained in the appendant information that is stored together with the compressed image data and if the degree of the smoothness is equal to or greater than the predetermined second degree of smoothness, the second color determining unit 117 can be configured such that it does not perform the color determination process. The degree of the smoothness is set in accordance with the operation input via the operation display device 57. The degree of the predetermined second degree of smoothness may be obtained, for example, by experiment and determined in advance.

Alternatively, when the compressed image data stored in the HDD 68 is reused, if the filter information is contained in the appendant information that is stored together with the compressed image data, color conversion may be performed using the first color determination result.

Fourth Embodiment

In the following, a fourth embodiment of the image processing apparatus and the image processing program will be described. Parts having the same configuration as those in the first to third embodiments described above are assigned the same reference numerals and therefore descriptions thereof are omitted.

In the fourth embodiment, a user is able to set, via the operation display device 57, color adjustment. Such color adjustment is, for example, chroma adjustment. If a user wants to reuse the scanned original image by making the image brighter and more brilliant in appearance, the user performs a setting to increase the degree of the chroma. By storing in the HDD 68 the image data representing the original image subjected to color adjustment in which the degree of the chroma is increased, when the image data is reused, the user does not need to perform the setting to increase the degree of the chroma of the image to be output every time the image data is reused. In addition to the function described in the first embodiment, the color conversion unit 104 in the first image processing apparatus 52 also performs color adjustment in accordance with the degree of the chroma that is set via the operation display device 57. The bus control device 67 sends, to the CPU 53, the compressed image data that is output from the first image processing apparatus 52. In addition to the image-region separation result and the first color determination result, which are used as the appendant information on the compressed image data, the bus control device 67 also sends, to the CPU 53, color adjustment information, as appendant information, indicating that the color conversion unit 104 has performed the color adjustment. After the CPU 53 receives the compressed image data and the appendant information, if the appendant information contains color adjustment information, the CPU 53 determines that the color determination result (the second color determination result) performed by the second color determining unit 117 is unreliable.

The second image processing apparatus 66 receives, via the CPU 53 and the bus control device 67, the compressed image data and the appendant information thereon; the reliability determination result; and the region specifying information, which are subjected to various kinds of processes including color adjustment in the first image processing apparatus 52 and are output therefrom. The configuration of the second image processing apparatus 66 is substantially the same as that in the first embodiment. However, if as a result of the reliability determination performed by the CPU 53, it is determined that the second color determination result is unreliable, the second color determining unit 117 does not perform a color determination process. In a similar manner as in the first embodiment, for the image data to be output that is output from the filter processing unit 111, the color conversion unit 112 performs color conversion in accordance with the output destination. However, in the ACS mode, if as a result of the reliability determination performed by the CPU 53 it is determined that the second color determination result is unreliable, the color conversion unit 112 performs, using the first color determination result, color conversion in accordance with an output destination. The method of performing color conversion is the same as that described in the first embodiment.

With the configuration described above, it is possible to maintain reliability with respect to the determination of the attributes of the image features such as color determination. When the color adjustment is performed, a colored portion of text represented in a black color (hereinafter, referred to as "black text") becomes brighter, which is significantly disadvantageous for correctly performing color determination in the ACS mode. In such a case, the performance of the color determination process performed by the second color determining unit 117 is significantly degraded. Accordingly, in such a case, it is useful for a user not to use the color determination result treating it as an unreliable result when the result is determined by the second color determining unit 117.

When the compressed image data stored in the HDD 68 is reused, the second color determining unit 117, instead of CPU 53, may determine whether the color adjustment information is contained in the appendant information that is stored together with the compressed image data. Furthermore, the second color determining unit 117 may perform the color determination process itself, and the color conversion unit 112 may determine whether to use the first color determination result or the second color determination result.

Furthermore, when the compressed image data stored in the HDD 68 is reused, if the color adjustment information is contained in the appendant information that is stored together with the compressed image data, the operation display device 57 may be configured such that a user is not able to set the ACS mode. Specifically, if the first image processing apparatus 52 performs color adjustment, the color conversion using the color determination result is not performed.

Alternatively, even when the operation display device 57 is configured such that a user is able to set the ACS mode, when the ACS mode is set, the operation display device 57 may be configured to display a warning message indicating that there is a high possibility that color determination in the ACS mode is erroneous. With this configuration, it is possible to prompt the user to manually set the color mode before the user is disadvantaged.

Furthermore, color adjustment information may also indicate, together with the completion of the color adjustment, the degree of the chroma. In such a case, when the compressed image data stored in the HDD 68 is reused, if the color adjustment information is contained in the appendant information that is stored together with the compressed image data and if the degree of the chroma is equal to or greater than the predetermined third degree of chroma, the second color determining unit 117 may be configured not to perform the color determination process. The degree of the chroma is set in accordance with the operation input via the operation display device 57. The degree of the predetermined third degree of chroma may be obtained, for example, by experiment and determined in advance.

Alternatively, when the compressed image data stored in the HDD 68 is reused, if the color adjustment information is contained in the appendant information that is stored together with the compressed image data, color conversion may be performed using the first color determination result.

Furthermore, the color adjustment is not limited to the chroma adjustment. Color profile adjustment or brightness adjustment may be used for the color adjustment. The color profile adjustment includes, for example, color replacement in which a black color is replaced with a red color. When color determination is performed in the ACS mode, a portion that contains a lighter color is determined to be a white color and thus determined to be an achromatic color. This prevents color shift of a light color, which occurs when an image is scanned, to be erroneously determined to be a chromatic color. Accordingly, in color profile adjustment, by performing color processing in which an RGB image difference or chroma is changed by replacing colors or by changing the degree of the brightness, in a similar manner as described above, the performance of the color determination process performed by the second color determining unit 117 is degraded. Accordingly, when such color adjustment is performed, it is useful for a user not to use the color determination result treating it as an unreliable result when the result is determined by the second color determining unit 117.

Fifth Embodiment

In the following, a fifth embodiment of the image processing apparatus and the image processing program will be described. Parts having the same configuration as those in the first to fourth embodiments described above are assigned the same reference numerals and therefore descriptions thereof are omitted.

Figure 17:
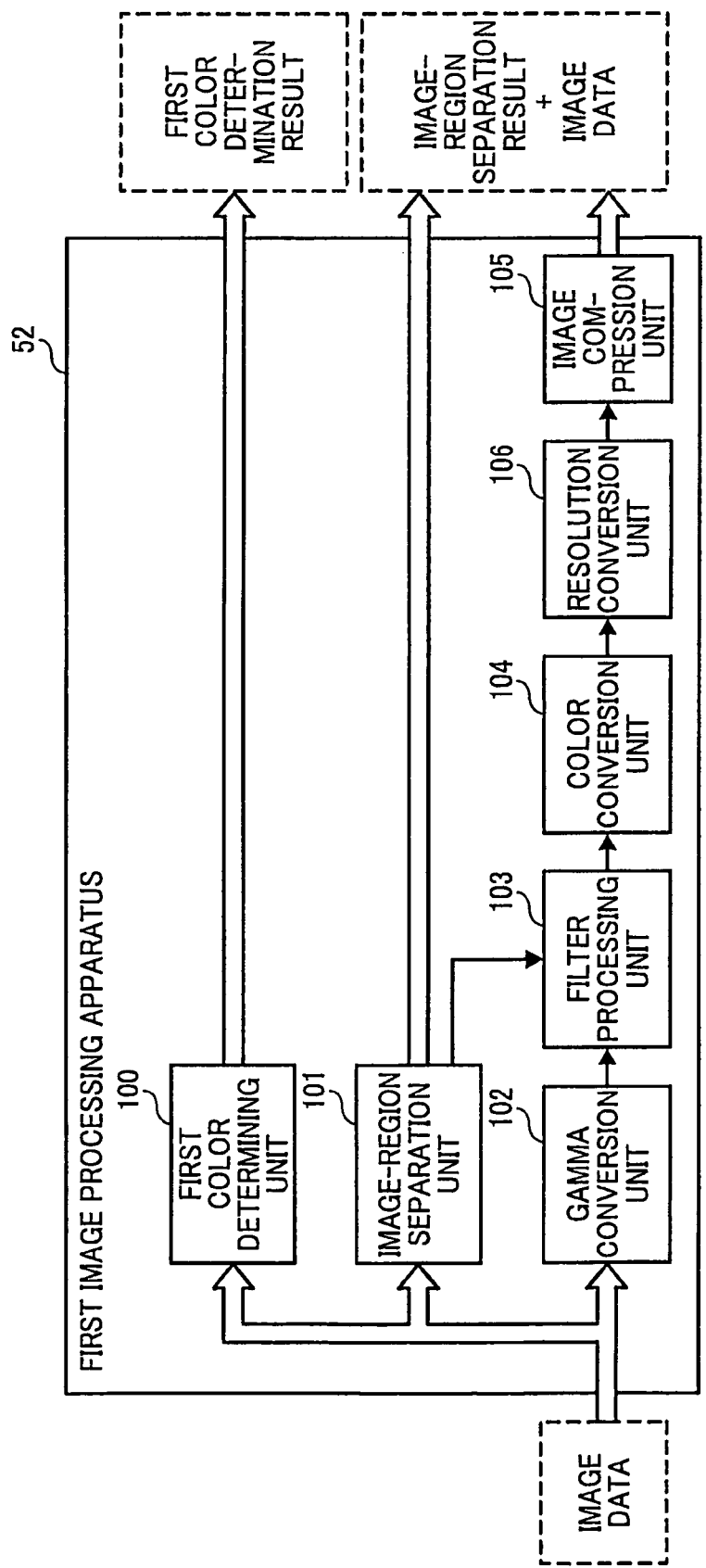
FIG. 17 is a schematic diagram illustrating, in detail, the configuration of the first image processing apparatus 52 according to a fifth embodiment.

In the fifth embodiment, as illustrated in FIG. 17, in addition to the first color determining unit 100, the image-region separation unit 101, the gamma conversion unit 102, the filter processing unit 103, the color conversion unit 104, and the image compression unit 105, the first image processing apparatus 52 includes a resolution conversion unit 106. The resolution conversion unit 106 performs resolution conversion (magnification change) on an image data to be output that is output from the color conversion unit 104.

For example, in a copying process, even when an image to be output is output at 600 dpi in the main-scanning direction× 600 dpi in the sub-scanning direction, there may be a case in which, in the scanning device 51, the original image is scanned at 300 dpi in the main-scanning direction×300 dpi in the sub-scanning direction. This is performed in order to increase productivity by reducing the amount of image transmission in a part of the first image processing apparatus 52 or by speeding up the scanning speed of the scanning device 51. In such a case, the resolution conversion unit 106 performs a process on an original image using a magnification of 200% to change image data to pseudo image data of 600 dpi. Accordingly, if a predetermined amount of color shift occurs in the original image that is scanned by the scanning device 51, when the image data is stored, the amount of color shift increases by a factor of two. Specifically, the amount of color shift in image data that is input to the second color determining unit 117 is effectively twice as much as the amount of color shift in image data that is input to the first color determining unit 100. When such a large color shift occurs, the reliability of the color determination process performed by the second color determining unit 117 is largely lowered.

Accordingly, in the fifth embodiment, when the resolution conversion unit 106 performs the resolution conversion, the CPU 53 or the color conversion unit 112 in the second image processing apparatus 66 determines that the second color determination result is unreliable. Then, the color conversion unit 112 performs color conversion using the first color determination result. However, in a similar manner as in the first embodiment, if a magnification specified by an operation input is greater than a predetermined magnification or if an image specified to be output is a part of the original image, there may be a case in which the first color determination result is unreliable. Accordingly, in such a case, as described in the modification of the second embodiment, for example, the color determination is not performed in the ACS mode or a warning message indicating that there is a high possibility that color determination in the ACS mode is erroneous is displayed on the operation display device 57.

With the configuration described above, it is also possible to maintain reliability with respect to the determination of the attributes of the image features such as color determination.

Sixth Embodiment

In the following, a sixth embodiment of the image processing apparatus and the image processing program will be described. Parts having the same configuration as those from the first embodiment to fifth embodiments described above are assigned the same reference numerals and therefore descriptions thereof are omitted.

In the embodiments described above, the second image processing apparatus 66 includes the second color determining unit 117, and, if the color determination process result performed by the first color determining unit 100 in the first image processing apparatus 52 is unreliable, the color determination process result performed by the second color determining unit 117 is used as needed. However, in the sixth embodiment, the second image processing apparatus 66 does not have the second color determining unit 117. Accordingly, by using the color determination process result performed by the first color determining unit 100, the second image processing apparatus 66 performs color determination in the ACS mode.

Figure 18:
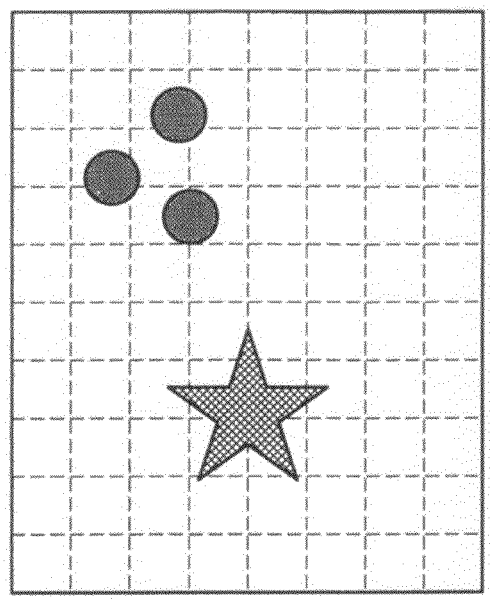
FIG. 18 is a schematic diagram illustrating an example of the original image illustrated in FIG. 3 that has been divided into parts.

The first color determining unit 100 performs a color determination process on image data that is output from the scanning device 51. At this time, for the original image represented by the image data, the first color determining unit 100 performs the color determination process for each determination region that is divided into parts. FIG. 18 is a schematic diagram illustrating an example of the original image illustrated in FIG. 3 that has been divided into parts. Rectangular regions bounded by the dotted lines in FIG. 18 are the determination regions. The first color determining unit 100 performs the color determination process for each determination region; associates each of the first color determination results with determination region information that indicates which portion of the original image corresponds to each determination region; and outputs it.

The bus control device 67 illustrated in FIG. 1 sends, to the CPU 53, the compressed image data that is output from the first image processing apparatus 52. The bus control device 67 also sends, to the CPU 53, as the appendant information on the compressed image data, the image-region separation result, the determination region information, and the first color determination result of each determination region.

Figure 19:
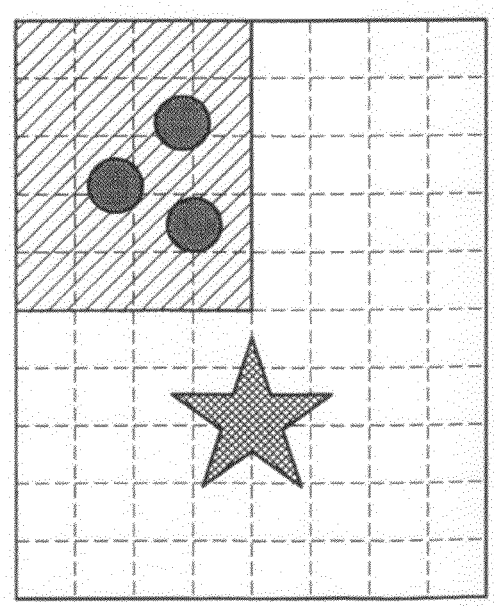
FIG. 19 is a schematic diagram illustrating an example of a determination region included in an image that is output by processing the original image illustrated in FIG. 3 using a magnification of 200%.

When the CPU 53 receives the compressed image data sent from the bus control device 67, and the appendant information on the compressed image data, which are the image-region separation result, the determination region information, and the first color determination result with respect to each determination region, and stores them in the memory 54. Thereafter, the CPU 53 stores them in the HDD 68. In accordance with an operation input that instructs an image to be output, the CPU 53 performs the following color determination in the ACS mode and allows the second image processing apparatus 66 to perform processing. Specifically, for the original image represented by the compressed image data, in accordance with an operation input that sets the magnification or the output size, the CPU 53 determines an image (image to be output) that corresponds to a region to be output. Then, in the ACS mode, using determination region information and the first color determination result of each determination region included in the appendant information on the compressed image data, the CPU 53 determines whether the image to be output is a chromatic image or an achromatic image. The CPU 53 selects a determination region that constitutes the image to be output; refers to the first color determination result corresponding to the determination region; and performs color determination to determine whether the image to be output is a chromatic image or an achromatic image. Specifically, if, from among all of determination regions selected to constitute the image to be output, there is at least one first color determination result indicating it to be a chromatic image, the CPU 53 determines that the image to be output is a chromatic image and if the first color determination results indicate that all are achromatic images, the CPU 53 determines that the image to be output is an achromatic image. For example, as illustrated in FIG. 19, with respect to the original image illustrated in FIG. 3, for an image to be output with a magnification of 200%, of the determination regions, only the determination regions shaded with diagonal lines are included in the image to be output. In this case, in accordance with the color determination result performed by the CPU 53, the image to be output is determined to be an achromatic image. When the CPU 53 allows the second image processing apparatus 66 to perform processing, the CPU 53 outputs, to the second image processing apparatus 66 via the bus control device 67, the following: the compressed image data and the appendant information thereon; color determination result (hereinafter, referred to as a "third color determination result") with respect to the image to be output; and region specifying information that specifies a determination region constituting the image to be output.

Figure 20:
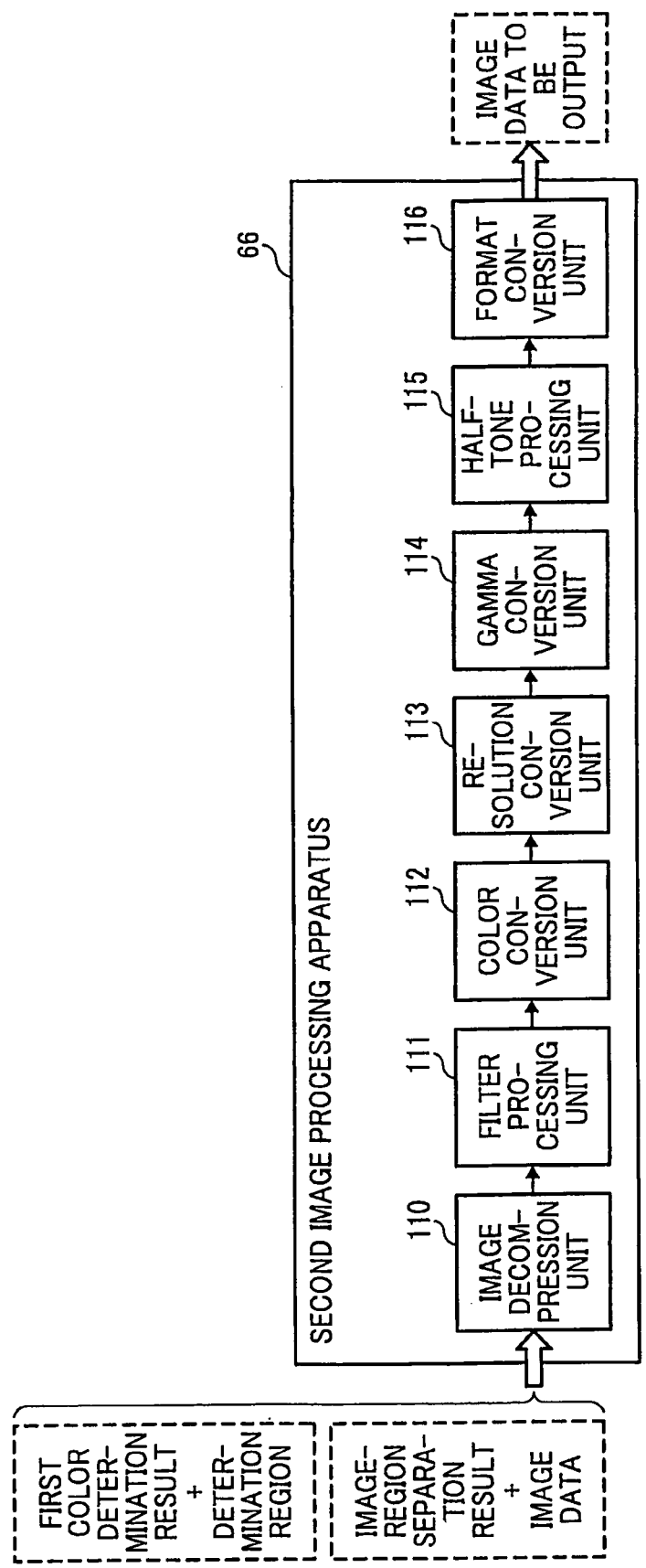
FIG. 20 is an example configuration of the second image processing apparatus 66 according to a sixth embodiment.

FIG. 20 is a schematic diagram illustrating the configuration of the second image processing apparatus 66 in detail. As illustrated in FIG. 20, the second image processing apparatus 66 does not include the second color determining unit 117 that is included in the configuration illustrated in FIG. 6. With such a configuration, in the ACS mode, using the third color determination result that is output from the CPU 53 and in accordance with an output destination, the color conversion unit 112 performs color conversion on the image data to be output that is output from the filter processing unit 111.

In the following, the flow of the process performed by the image forming apparatus 50 according to the sixth embodiment that is different from the first embodiment will be described. In the copying process illustrated in FIG. 7, at Step S3, the first color determining unit 100 determines, for each determination region, whether the original image represented by input RGB image data is a chromatic image or an achromatic image and outputs a determination result (the first color determination result) for each determination region. At Step S5, the bus control device 67 sends, to the CPU 53, the compressed image data that is output from the first image processing apparatus 52. The bus control device 67 also sends, to the CPU 53, as the appendant information on the compressed image data, the image-region separation result, the determination region information, and the first color determination result of each determination region. At Step S6, the CPU 53 associates the image-region separation result, the determination region information and the first color determination result, as the appendant information, with the compressed image data and stores them in the memory 54. At Step S7, for the original image represented by the compressed image data, in accordance with the operation input that sets the magnification or the output size, the CPU 53 determines an image (image to be output) that corresponds to a region to be output. Then, in the ACS mode, from among all of the determination regions selected to constitute the image to be output, if there is at least one color determination result indicating it to be a chromatic image, the CPU 53 determines that the image to be output is a chromatic image, and if the color determination results indicate that all are achromatic images, the CPU 53 determines that the image to be output is an achromatic image. At Step S8, to allow the second image processing apparatus 66 to perform processing, the CPU 53 reads, from the memory 54, the compressed image data and the appendant information thereon and sends them to the bus control device 67. At Step S9, the bus control device 67 outputs them to the second image processing apparatus 66.

Furthermore, the CPU 53 outputs, to the second image processing apparatus 66 via the bus control device 67, the color determination result (the third color determination result) of the image to be output and the region specifying information that specifies the determination regions constituting the image to be output. At Step S10, for the 8-bit RGB image data to be output that is output from the filter processing unit 111, in accordance with the third color determination result sent from the CPU 53, the color conversion unit 112 performs color conversion in accordance with the color space of the plotter 56.

Furthermore, for the scanner delivery process, the image storing process, the copying process and the image storing process, the scanner delivery process and the image storing process, and the reusing of a stored image, substantially the same portions as those described in the above copying process differ from those described in the first embodiment.

As described above, the first image processing apparatus 52 divides the original image into multiple determination regions; performs color determination on each determination region; and stores, therein together with image data that represents the original image, the first color determination result of each determination region. Then, when the image data is reused, in accordance with the magnification, the resolution, or a scanning region, the CPU 53 determines the image to be output, and, using the first color determination result of each determination region constituting the image to be output, performs color determination on the image to be output. Accordingly, when the original image is reused, even if the color determination process result with respect to the entire original image is unreliable because the image to be output becomes a part of the original image, it is possible to appropriately perform color determination on the image to be output. As a result, it is possible to reduce the processing cost or the processing time and to save a storage capacity, thus solving any problem that occurs upon reusing of the image data.

In the example illustrated in FIG. 18, the determination regions are obtained by dividing the original image into eight in the main-scanning direction and ten in the sub-scanning direction; however, the number of regions into which the original image is divided is not limited thereto. As the number of the determination regions increases, there is an increase in the various kinds of reuse methods that are available. Because all of the combinations of the determination regions and the color determination results are stored in the HDD 68, if the original image is divided into too many determination regions, an extremely large HDD is required and also the processing time required for obtaining the determination regions constituting the image to be output and the color determination result thereof increases. Accordingly, it is preferable that the number of divisions is appropriately set.

Furthermore, the CPU 53 is configured such that, using the first color determination result for each determination region, the CPU 53 performs color determination on the image to be output; however, the configuration is not limited thereto. For example, a color determining unit may be provided in the second image processing apparatus 66, which performs the color determination.

Figure 16:
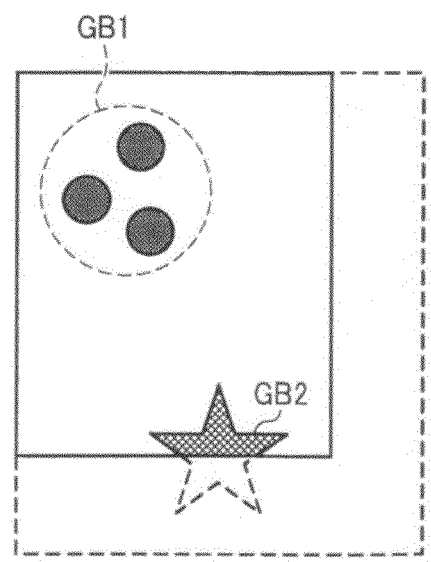
FIG. 16 is a schematic diagram illustrating an example image that is output by processing the original image illustrated in FIG. 3 using a magnification of 115%.
Figure 21:
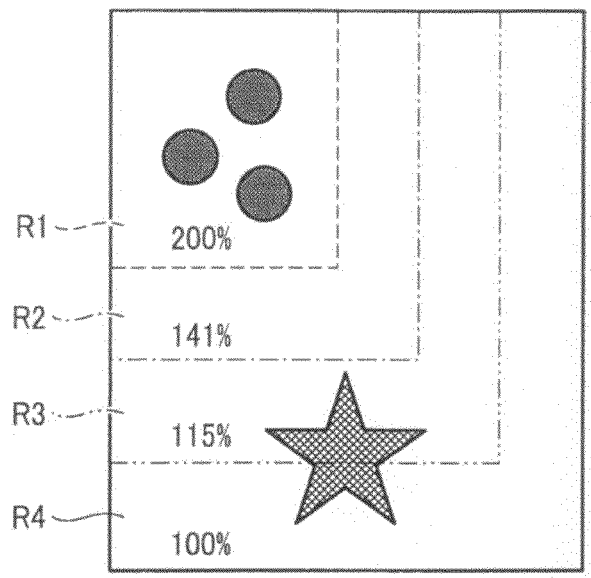
FIG. 21 is a schematic diagram illustrating examples of determination regions that correspond respectively to magnifications of 200%, 141%, 115%, and 100%.
Figure 22:
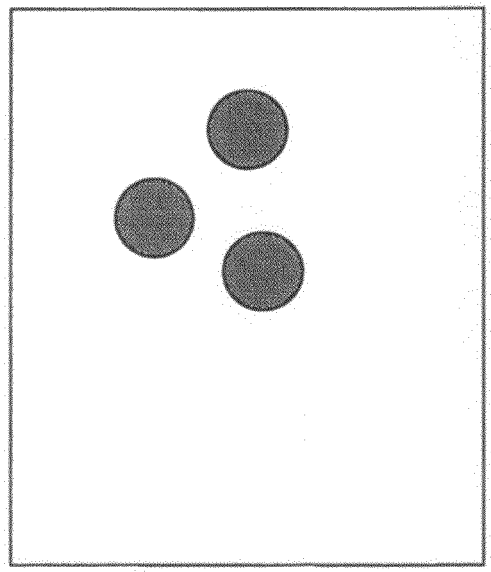
FIG. 22 is a schematic diagram illustrating an example image that is output by processing the original image illustrated in FIG. 3 using a magnification of 141%.

In the example described above, the determination regions are obtained by dividing the entire original image; however it is not limited thereto. For example, a determination region may be set in accordance with a magnification between standard transfer paper sizes. This is because enlargement and reduction copying is often performed between standard transfer paper sizes. For example, reduction copying is performed from A3 size to A4 size (magnification of 71%), and enlargement copying is performed from A4 size to A3 size (magnification of 141%) or from B5 size to A4 size (magnification of 115%). Accordingly, determination regions each corresponding to one of preset magnifications such as 50%, 61%, 71%, 82%, 87%, 100%, 115%, 122%, 141%, and 200%, are set as most frequently used magnifications. FIG. 21 is a schematic diagram illustrating examples of determination regions that correspond respectively to magnifications of 200%, 141%, 115%, and 100% from among the above magnifications. The rectangular region bounded by a dotted line is a region to be determined R1 that corresponds to a magnification of 200%. The rectangular region, which includes determination region R1, bounded by the dashed line is a region to be determined R2 that corresponds to a magnification of 141%. The rectangular region, which includes the determination regions R1 and R2, bounded by the chain double-dashed line is a region to be determined R3 that corresponds to a magnification of 115%. The rectangular region, which includes the determination regions R1 to R3, is a region to be determined R4 that corresponds to a magnification of 100% and corresponds to the original image. In this case, the first image processing apparatus 52 determines that the determination regions R1 and R2 are achromatic images and determines that the determination regions R3 and R4 are chromatic images. For example, if an operation input that instructs the original image to be enlarged from B5 size to A4 size, that is, to perform magnification of 115%, the CPU 53 determines the determination region R3 to be an image to be output and determines as a color determination result of the image to be output, that the determination region R3 is a chromatic image. Then, for example, the copying process is performed in the above described manner, to output an image like the one illustrated in FIG. 22. Furthermore, if a magnification is 141%, an image like the one illustrated in FIG. 16 is output. If a magnification is 200%, an image like the one illustrated in FIG. 5 is output.

As described above, a user sets determination regions corresponding to situations which are frequently used upon reuse by a user. The HDD 68 stores therein color determination results corresponding to the determination regions. Image data stored in the HDD 68 is reused in the ACS mode. With this configuration, the storage capacity required for the HDD 68 becomes small. Furthermore, the processing time required for obtaining determination regions and color determination results in accordance with the image to be output is reduced. Accordingly, it is possible to maintain reliability with respect to the determination of the attributes of the image features such as color determination while preventing the reduction of productivity.

Seventh Embodiment

In the following, a seventh embodiment of the image processing apparatus and the image processing program will be described. Parts having the same configuration as those in the first embodiment to the sixth embodiment described above are assigned the same reference numerals and therefore descriptions thereof are omitted.

In the embodiments described above, to determine the image color features, color determination is performed to determine whether the attributes of an image to be output are that of a chromatic image or an achromatic image. In the seventh embodiment, image quality features are determined for original types. Examples of such original types include a text original, a photographic original, and a text and photographic original. A text original includes text, a photographic original includes a picture, and a text and photographic original includes both text and photograph. A mode that automatically determines the original type is referred to as an "original type determining mode". The original type determining mode is set by an operation input received from a user via the operation display device 57.

Figure 23:
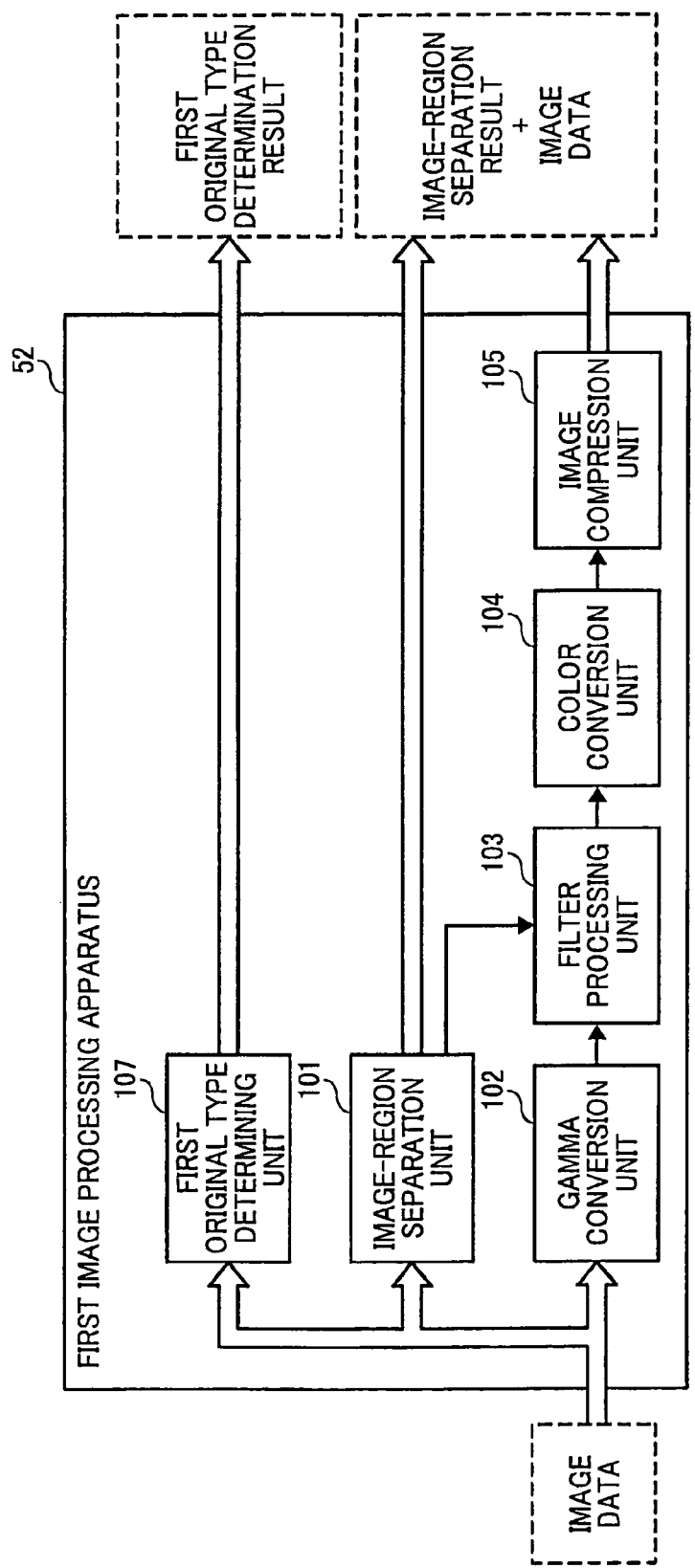
FIG. 23 is a schematic diagram illustrating the configuration, in detail, of the first image processing apparatus 52 according to a seventh embodiment.

FIG. 23 is a schematic diagram illustrating the configuration, in detail, of the first image processing apparatus 52. As illustrated in FIG. 23, instead of the first color determining unit 100 illustrated in FIG. 2, the first image processing apparatus 52 includes a first original type determining unit 107. The first original type determining unit 107 performs an original type determination process for determining whether an original image represented by input RGB image data is a text original image, a photographic original image, or a text and photographic original image. Specifically, though the first original type determining unit 107 performs the image-region separation process in a similar manner as that performed by the image-region separation unit 101, the first original type determining unit 107 recognizes a line-drawing region represented by the input RGB image data in the original image; determines, using the ratio of the line-drawing region to a single-scanned original image, pixels belonging to a text region; and counts the number of pixels. If the number of pixels is equal to or greater than a first predetermined number, the first original type determining unit 107 determines that the original image is a text original image. Furthermore, the first original type determining unit 107 recognizes a dot region in the original image; determines, using the ratio of the dot region to a single-scanned original image, pixels belonging to the picture region; and counts the number of pixels. If the number of pixels is equal to or greater than a second predetermined number, the first original type determining unit 107 determines that the original image is a photographic original image. Furthermore, if the number of pixels belonging to the text region is equal to or greater than the first predetermined number and if the number of pixels belonging to the picture region is equal to or greater than the second predetermined number, the first original type determining unit 107 determines that the original image is a text and photographic original image. The original type determination process result is referred to as a "first original type determination result". A known method may be used for determining a text region or a dot region.

The bus control device 67 illustrated in FIG. 1 sends, to the CPU 53, the compressed image data that is output from the first image processing apparatus 52, and also sends, to the CPU 53, the image-region separation result and the first original type determination result as the appendant information on the compressed image data. When the CPU 53 receives, via the bus control device 67, the image-region separation result and the first original type determination result, as the appendant information on the compressed image data, and also receives the compressed image data, all of which are output from the first image processing apparatus 52, the CPU 53 stores them in the memory 54. Furthermore, in accordance with an operation input that instructs an image to be output and that is input from the operation display device 57, the CPU 53 determines whether a magnification is specified as a magnification equal to or greater than a predetermined magnification or whether an image specified to be output is a part of the original image. If the magnification specified by the operation input is equal to or greater than the predetermined magnification or if an image specified to be output is a part of the original image, the CPU 53 determines that the first original type determination result is unreliable. For example, if an image to be output is a part of the original image even though the entire original image is a text and photographic original image, there may be a case in which the image to be output only includes a text image. In such a case, if the first original type determination result is used, original type of the image to be output cannot be appropriately determined. Accordingly, instead of using the first original type determination result, a second original type determining unit 118 performs the original type determination process, which will be described below. This makes it possible to appropriately determine the original type of the image to be output.

Figure 24:
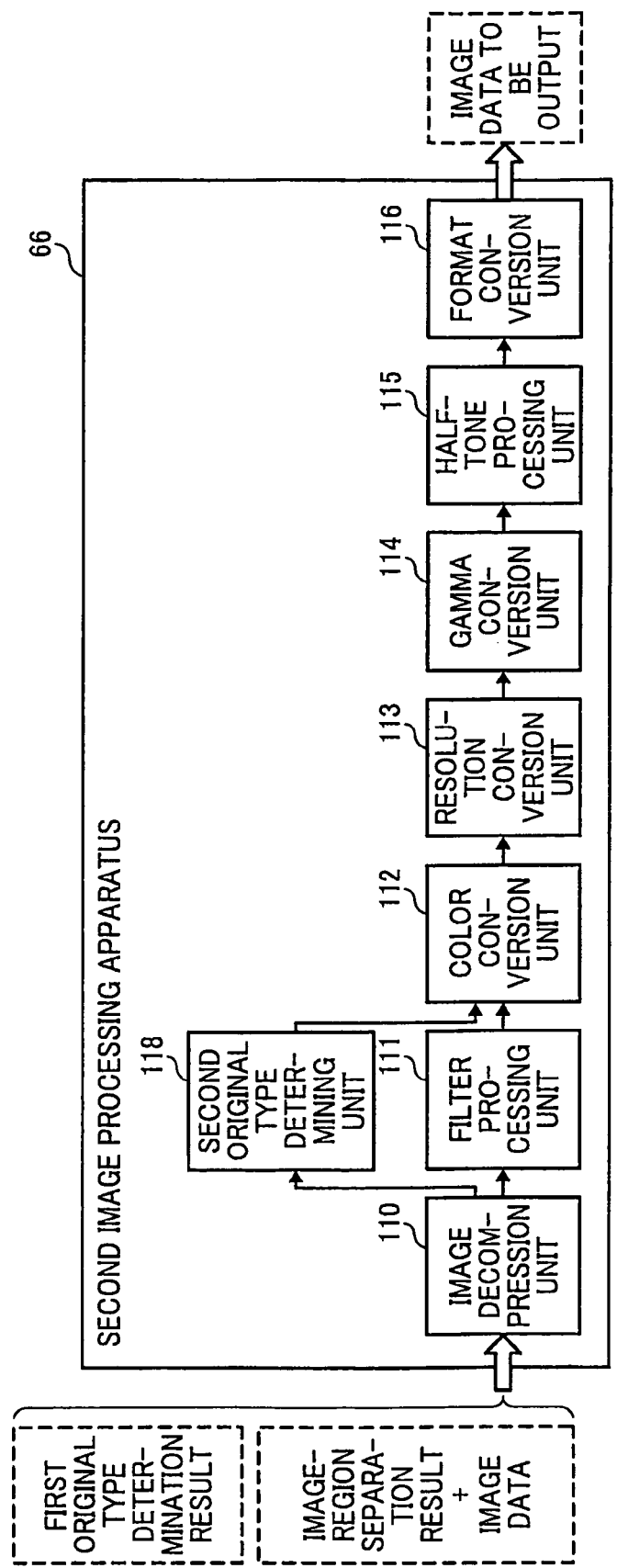
FIG. 24 is a schematic diagram illustrating the configuration of the second image processing apparatus 66 according to the seventh embodiment.

FIG. 24 is a schematic diagram illustrating the configuration, in detail, of the second image processing apparatus 66. As illustrated in FIG. 24, instead of the second color determining unit 117 illustrated in FIG. 6, the second image processing apparatus 66 includes the second original type determining unit 118. For an image represented by RGB image data that is output from the image decompression unit 110, the second original type determining unit 118 performs the original type determination process for determining whether the image to be output that corresponds to a region specified by the region specifying information is a text original image, a photographic original image, or a text and photographic original image. The original type determination process result is referred to as a "second original type determination result". The method of performing the original type determination process is the same as that performed by the first original type determining unit 107.

For the RGB image data that is output from the image decompression unit 110, the filter processing unit 111 performs filter processing on the image to be output that corresponds to a region specified by the region specifying information. The filter processing unit 111 performs the filter processing, in the original type determining mode, in accordance with the reliability determination result performed by the CPU 53. Specifically, if the first original type determination result is determined to be unreliable, the filter processing unit 111 performs the filter processing using the second original type determination result. Furthermore, if the image to be output is a text original image, the filter processing unit 111 performs a sharpening process in which the degree of the sharpness is increased. If the image to be output is a photographic original image, the filter processing unit 111 performs a smoothing process in which the degree of the smoothness is, increased. If the image to be output is a text and photographic original image, the filter processing unit 111 performs a process that corresponds to a mid-process between the sharpening process in which the degree of the sharpness is increased and the smoothing process in which the degree of the smoothness is increased.

For the image data to be output that is output from the filter processing unit 111, the color conversion unit 112 performs color conversion in accordance with the output destination. In the original type determining mode, in accordance with the reliability determination result performed by the CPU 53, the color conversion unit 112 performs color conversion in accordance with the output destination. Specifically, if the first original type determination result is determined to be unreliable, the color conversion unit 112 performs color conversion using the second original type determination result. For example, if the image forming apparatus 50 performs a copying operation and if the output destination is the plotter 56, in accordance with the reliability determination result performed by the CPU 53, using the first original type determination result included in the appendant information or using the second original type determination result that is output from the second original type determining unit 118, the color conversion unit 112 performs color conversion by converting 8-bit RGB image data to 8-bit CMYK image data or to 8-bit K image data that is the color space of the plotter 56. Specifically, if the image to be output is determined to be a text original image, the color conversion unit 112 performs color conversion by converting 8-bit RGB image data to 8-bit K image data. If the image to be output is determined to be a photographic original image or a text and photographic original image, the color conversion unit 112 performs color conversion by converting 8-bit RGB image data to 8-bit CMYK image data.

In the following, the flow of a process performed by the image forming apparatus 50 according to the seventh embodiment that is different from that in the first embodiment will be described. In the copying process illustrated in FIG. 7, at Step S3, the first original type determining unit 107 determines the original type of the original image represented by the input RGB image data and outputs the determination result thereof (the first original type determination result). At Step S5, the bus control device 67 sends, to the CPU 53, the compressed image data that is output from the first image processing apparatus 52. The bus control device 67 sends, to the CPU 53, as the appendant information on the compressed image data, the image-region separation result and the first original type determination result. At Step S6, the CPU 53 associates the image-region separation result and the first original type result, as the appendant information, with the compressed image data and stores it in the memory 54. At Step S7, for the original image represented by the compressed image data, in accordance with an operation input that sets the magnification or the output size, the CPU 53 determines an image that corresponds to a region to be output (output target image). Then, in the original type determining mode, the CPU 53 determines whether the magnification is specified by the operation input to be equal to or greater than a predetermined magnification (for example 200%) or whether an image specified to be output is a part of the original image. If the magnification is equal to or greater than the predetermined magnification or if the image specified to be output is a part of the original image, the CPU 53 determines that the first original type determination result is unreliable. This becomes the reliability determination result. At Steps S8 and S9, the second image processing apparatus 66 receives, via the CPU 53 and the bus control device 67, the following: the reliability determination result, the compressed image data, the appendant information thereon, and the region specifying information specifying a region that corresponds to the image to be output. At Step S10, for the RGB image data that is output from the image decompression unit 110, in accordance with the reliability determination result performed by the CPU 53, the filter processing unit 111 performs filter processing on the image to be output that corresponds to a region specified by the region specifying information. For 8-bit RGB image data to be output that is output from the filter processing unit 111, in accordance with the reliability determination result performed by the CPU 53, the color conversion unit 112 performs color conversion in accordance with the color space of the plotter 56.

Furthermore, as to the scanner delivery process, the image storing process, the copying process and the image storing process thereof, the scanner delivery process and the image storing process thereof, and reusing a stored image, substantially the same portions as those described with respect to the copying process differ from those described in the first embodiment.

With the configuration described above, it is possible to maintain reliability with respect to the determination of the attributes of the image features such as original type determination.

The original types are not limited to the above examples. In addition to the original types described above, types like an inkjet original, a developing paper original, a print original, a copy original, a map original, and the like may be determined. To perform this determination, techniques described in, for example, the following Patent Documents may be used: Japanese Patent No. 3313592, Japanese Patent No. 3530324, Japanese Patent No. 3767210, and Japanese Patent Application Laid-open No. 2000-315258. In accordance with such original types, in the filter processing, the image forming apparatus 50 may perform the sharpening process in which the degree of the sharpness is increased, the smoothing process in which the degree of smoothness is increased, or color conversion.

MODIFICATION

The present invention is not limited to the embodiments described above. For example, upon implementation, the components may be modified as long as they do not depart from the substance of the present invention. Furthermore, various inventions may be formed by appropriately combining a plurality of the components disclosed in the above embodiments. For example, some components may be eliminated from the components described in the above embodiments. Furthermore, the components described in the different embodiments may be combined as appropriate. Furthermore, various modifications described below may be implemented.

In the embodiments described above, various kinds of programs executed by the CPU 53 in the image forming apparatus 50 may be configured such that the programs are stored in a computer connected to a network such as the Internet and are downloaded via a network. Furthermore, the various kinds of programs may be configured such that files are stored, in an installable or executable manner, in a computer readable recording medium including an optical recording medium such as a CD-ROM, a CD-R, a digital versatile disk (DVD), a magnetic recording medium such as a flexible disk (FD), magneto-optical medium, semiconductor recording medium, or the like. Furthermore, all or a part of the various kinds of programs may be installed in an operating system (OS) or may function as an OS.

In the embodiments described above, the first image processing apparatus 52 and the second image processing apparatus 66 are configured as hardware, a function that is implemented by at least one of the first image processing apparatus 52 and the second image processing apparatus 66 may be realized by the CPU 53 executing the program.

Furthermore, it has been mentioned that the image forming apparatus 50 is used in an MFP as an example; however it is not limited thereto. For example, the image forming apparatus 50 may be used in a copying machine, a printer, a facsimile, or the like. Furthermore, the image forming apparatus 50 may be applied to a system constituted of multiple devices (e.g., a host computer, an interface device, a scanner, and a printer) or to an apparatus constituted of a single device (e.g., a host computer).

According to an aspect of the present invention, in accordance with a characteristic of an image to be output, it is possible to maintain reliability with respect to a determination of an attribute of an image feature.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
a scanning unit configured to scan an original image from an original;
a first attribute determining unit configured to determine an attribute of an image feature of the original image scanned by the scanning unit;
a first image processing unit configured to perform a first image processing on image data representing the original image;
a storing unit configured to store the image data on which the first image processing has been performed by the first image processing unit;
an input receiving unit configured to instruct to output the original image represented by the image data stored in the storing unit and to receive an operation input for deciding an output target image to be output of the original image;
a deciding unit configured to decide, in accordance with the operation input received by the input receiving unit, the output target image to be output of the original image;
a second attribute determining unit configured to determine an attribute of an image feature of the output target image decided by the deciding unit;
a reliability determining unit configured to determine, in accordance with the operation input, at least one of whether the attribute determined by the first attribute determining unit is reliable and whether the attribute determined by the second attribute determining unit is reliable; and
a second image processing unit configured to output, by performing a second image processing on the image data, output target image data representing the output target image, in accordance with a result of the determination by the reliability determining unit.

2. The image processing apparatus according to claim 1, wherein the second image processing unit outputs the output target image data representing the output target image by performing the second image processing on the image data using the attribute determined by the second attribute determining unit if the reliability determining unit determines that the attribute determined by the first attribute determining unit is not reliable.

3. The image processing apparatus according to claim 1, wherein
the storing unit stores attribute determination information indicating the attribute determined by the first attribute determining unit and the image data correspondingly with each other, and
the second image processing unit outputs the output target image data representing the output target image by performing the second image processing on the image data using the attribute indicated by the attribute determination information that has been stored correspondingly with the image data, if the reliability determining unit determines that the attribute determined by the first attribute determining unit is reliable.

4. The image processing apparatus according to claim 1, wherein the second attribute determining unit does not perform the determination of the attribute if the reliability determining unit determines that the attribute determined by the second attribute determining unit is not reliable.

5. The image processing apparatus according to claim 4, wherein, the second image processing unit outputs the output target image data representing the output target image by performing the second image processing on the image data without using the attribute determined by the second attribute determining unit and the attribute indicated by the attribute determination information.

6. The image processing apparatus according to claim 1, further comprising a display control unit configured to display, in accordance with the result of the determination by the reliability determining unit, a warning message indicating that there is a possibility that the attribute is erroneously determined, if the input receiving unit receives an operation input that sets a mode in which the attribute is automatically determined.

7. The image processing apparatus according to claim 1, wherein
the second image processing unit performs, in accordance with the operation input received by the input receiving unit, the second image processing by treating only a part of the original image represented by the image data as the output target image, and
the reliability determining unit determines that the attribute determined by the first attribute determining unit is not reliable if a size difference between the original image and the part of the original image to be the output target image is equal to or greater than a predetermined magnitude.

8. The image processing apparatus according to claim 7, wherein
the second image processing unit performs the second image processing including a process of changing a magnification of the original image to a magnification specified by the operation input and treating a part of the original image that has been subjected to the magnification change as the output target image, and
the reliability determining unit determines that the attribute determined by the first attribute determining unit is not reliable if the magnification is equal to or greater than a predetermined magnification.

9. The image processing apparatus according to claim 7, wherein the second image processing unit performs the second image processing by treating, as the output target image, a part of the original image specified to be output by the operation input, or by treating, in accordance with an output size specified by the operation input, a part of the original image as the output target image.

10. The image processing apparatus according to claim 1, wherein
the first image processing unit performs the first image processing including an image editing process of adjusting an image quality of the original image represented by the image data, and
the reliability determining unit determines that the attribute determined by the second attribute determining unit is not reliable if a degree of the adjustment is equal to or greater than a predetermined degree.

11. The image processing apparatus according to claim 10, wherein
the image editing process is filter processing performed using a degree of enhancement or a degree of smoothness of a filter, and
the reliability determining unit determines that the attribute determined by the second attribute determining unit is not reliable if the degree of enhancement is equal to or greater than a predetermined first degree or if the degree of smoothness is equal to or greater than a predetermined second degree.

12. The image processing apparatus according to claim 10, wherein the image editing process is a process of performing a color adjustment on the original image, the first attribute determining unit performs the determination of the attribute of determining whether the original image is a chromatic image or an achromatic image, the second attribute determining unit performs the determination of the attribute of determining whether the output target image is a chromatic image or an achromatic image, and the reliability determining unit determines that the attribute determined by the second attribute determining unit is not reliable if a degree of the color adjustment is equal to or greater than a predetermined third degree.

13. The image processing apparatus according to claim 10, wherein the first attribute determining unit performs the determination of the attribute of determining whether the original image is a chromatic image or an achromatic image, the second attribute determining unit performs the determination of the attribute of determining whether the output target image is a chromatic image or an achromatic image, and the reliability determining unit determines that the attribute determined by the second attribute determining unit is not reliable if the first image processing unit has performed the first image processing including the image editing process in which color shifting that occurs when the scanning unit scans the original image increases.

14. The image processing apparatus according to claim 13, wherein the first image processing unit performs the first image processing including the image editing process of enlarging the original image.

15. The image processing apparatus according to claim 1, further comprising:

a format conversion unit that assigns, as appendant information, the attribute used in the second image processing by the second image processing unit to the output target image data and that creates an image file by converting the output target image data to a predetermined format, and an image sending unit that sends, to an external device, the image file created by the format conversion unit.

16. The image processing apparatus according to claim 1, further comprising an image forming unit that performs image formation by forming an image based on the output target image data that has been output by the second image processing unit and outputting the formed image on a sheet of transfer paper.

17. An image processing method, comprising:

scanning by a processor an original image from an original;

determining by the processor a first attribute of an image feature of the scanned original image;

performing by the processor a first image processing on image data representing the original image;

storing by the processor the image data on which the first image processing has been performed;

instructing by the processor to output the original image represented by the stored image data and receiving by the processor an operation input for deciding an output target image to be output of the original image;

deciding by the processor, in accordance with the received operation input, the output target image to be output of the original image;

determining by the processor a second attribute of an image feature of the decided output target image;

determining by the processor, in accordance with the operation input, at least one of whether the determined first attribute is reliable and whether the determined second attribute is reliable; and outputting by the processor, by performing a second image processing on the image data, output target image data representing the output target image, in accordance with a result of the determination of the reliability.

18. The image processing method according to claim 17, wherein the output target image data representing the output target image is output by performing the second image processing on the image data using the determined second attribute if the determined first attribute is determined to be not reliable.

19. The image processing method according to claim 17, wherein in the storing, attribute determination information indicating the determined first attribute and the image data are stored correspondingly with each other, and the output target image data representing the output target image is output by performing the second image processing on the image data using the attribute indicated by the attribute determination information that has been stored correspondingly with the image data, if the determined first attribute is determined to be reliable.

20. The image processing apparatus according to claim 17, wherein the determination of the second attribute is not performed if the determined second attribute is determined to be not reliable.

* * * * *